United States Patent
Robinson et al.

(10) Patent No.: US 10,574,631 B2
(45) Date of Patent: *Feb. 25, 2020

(54) SECURE AND PRIVATE MOBILE WEB BROWSER

(71) Applicant: Finjan Mobile, Inc., East Palo Alto, CA (US)

(72) Inventors: Scot Robinson, Rolling Hills Estates, CA (US); Jules Panopoulos, Mountain View, CA (US); Patrick Conlin, Newport Beach, CA (US); Julie Mar-Spinola, San Jose, CA (US)

(73) Assignee: Finjan Mobile, Inc., East Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,143

(22) Filed: Aug. 23, 2018

(65) Prior Publication Data

US 2019/0014087 A1    Jan. 10, 2019

Related U.S. Application Data

(63) Continuation-in-part of application No. 15/675,739, filed on Aug. 13, 2017, now Pat. No. 10,069,858, and
(Continued)

(51) Int. Cl.
*H04L 29/06* (2006.01)
*H04W 12/02* (2009.01)

(52) U.S. Cl.
CPC ........ *H04L 63/0272* (2013.01); *H04L 63/145* (2013.01); *H04W 12/02* (2013.01)

(58) Field of Classification Search
CPC ............... H04L 63/145; H04L 63/0272; H04L 12/4641; H04L 61/2007; H04L 67/02;
(Continued)

(56) References Cited

U.S. PATENT DOCUMENTS 8,402,011 B1   3/2013  Bodenhamer
8,584,240 B1   11/2013 Yang et al.
(Continued)

FOREIGN PATENT DOCUMENTS

WO   2010081160 A2   7/2010
WO   2015013215 A1   1/2015

OTHER PUBLICATIONS

Tenta Browser Blog, "Keep Your Private Browsing Private", Publication Date: Oct. 12, 2016 (Year: 2016).*
(Continued)

*Primary Examiner* — Yogesh Paliwal
(74) *Attorney, Agent, or Firm* — Soquel Group I.P Ltd

(57) ABSTRACT

A mobile browser embedded in a smartphone operative to open a secure private session with a server using an IP address of the smartphone, including a VPN connector integrated within a mobile browser such that the VPN connector loads automatically upon opening the browser, operative to connect the smartphone to a secure VPN server and to establish a virtual IP address for the smartphone, the virtual IP address corresponding to the location of the VPN server, wherein the VPN connector enables the browser to operate in three modes; namely, a VPN connection alone without browsing, browsing without a VPN connection, and browsing with a VPN connection, and a switch operative to change a current IP address of the smartphone used by the mobile browser from a non-VPN IP address to the virtual IP address of the VPN server, in a seamless manner without interrupting a current session with a server.

10 Claims, 31 Drawing Sheets

Related U.S. Application Data a continuation-in-part of application No. 15/069,981, filed on Mar. 15, 2016, now Pat. No. 10,091,214.

(60) Provisional application No. 62/517,882, filed on Jun. 10, 2017, provisional application No. 62/480,453, filed on Apr. 2, 2017, provisional application No. 62/412,034, filed on Oct. 24, 2016, provisional application No. 62/159,862, filed on May 11, 2015.

(58) Field of Classification Search
CPC ............... H04L 67/22; H04L 61/6018; G06F 2221/2119; G06F 21/56; H04W 12/02; H04W 80/04; H04W 88/02
See application file for complete search history.

(56) References Cited

U.S. PATENT DOCUMENTS

| | | | |
|---|---|---|---|
| 8,869,271 | B2 | 10/2014 | Jayaraman et al. |
| 8,904,495 | B2 | 12/2014 | Baghdasaryan et al. |
| 9,100,426 | B1 | 8/2015 | Fang |
| 9,398,032 | B1 | 7/2016 | Wan et al. |
| 2007/0208822 | A1 | 9/2007 | Wang et al. |
| 2008/0200168 | A1* | 8/2008 | Jiang .................... H04W 48/18 455/432.1 |
| 2010/0205297 | A1 | 8/2010 | Sarathy |
| 2010/0205665 | A1 | 8/2010 | Komili et al. |
| 2010/0257603 | A1 | 10/2010 | Chander et al. |
| 2010/0275024 | A1* | 10/2010 | Abdulhayoglu .... G06F 21/6218 713/175 |
| 2012/0047461 | A1 | 2/2012 | Colvin et al. |
| 2014/0215033 | A1 | 7/2014 | Ravichandran et al. |
| 2015/0067853 | A1 | 3/2015 | Amrutkar et al. |
| 2016/0330237 | A1 | 11/2016 | Edlabadkar |

OTHER PUBLICATIONS

Tenta Browser Blog, "Protect Your Entire Device With Tenta's Device Wide Built in VPN", Publication Date: Dec. 27, 2016 (Year: 2016).*
PCT/US2016/026856, International Search Report and Writen Opinion, dated Jul. 11, 2016, 11 pages.
PCT/US2017/056709, International Search Report, dated Jan. 8, 2018, 2 pages.
PCT/US2017/056709, Written Opinion, dated Jan. 8, 2018, 7 pages.
PCT/US2017/056436, International Search Report and Writen Opinion, dated Mar. 7, 2018, 13 pages.
Tenta Browser: Your Private Encrypted Browser, Nov. 16, 2016. https://tenta.com/.
Disconnecme, 2013. https://github.com/disconnectme.
Ghostery; Faster, safer, and smarter browsing, 2009. https://www.ghostery.com/.

* cited by examiner

FIG. 29

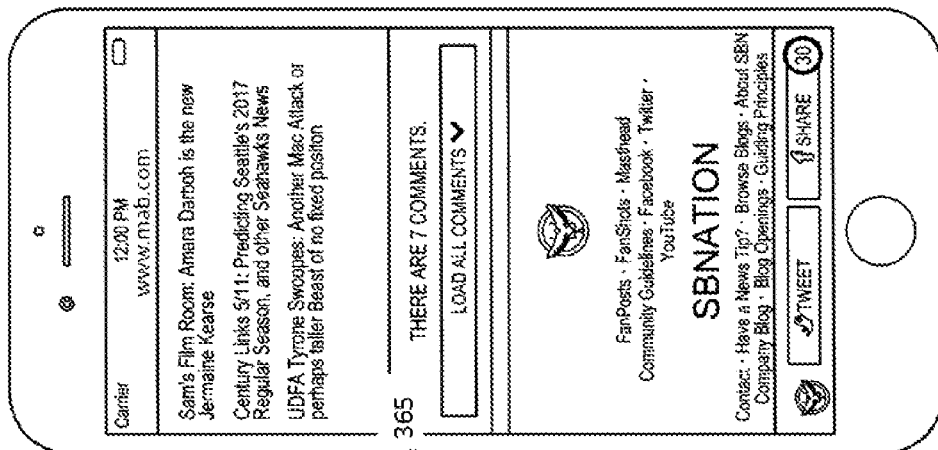
FIG. 39
FIG. 40
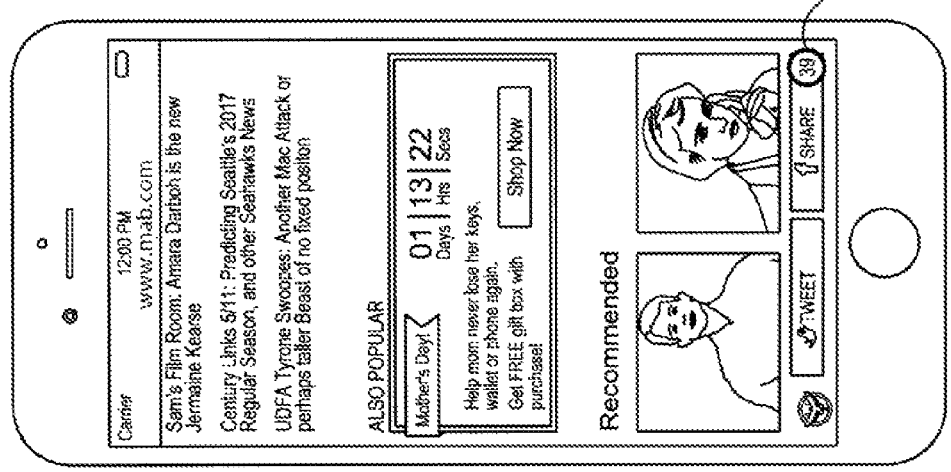
FIG. 38

SECURE AND PRIVATE MOBILE WEB BROWSER

PRIORITY REFERENCE TO PROVISIONAL APPLICATIONS

This application claims benefit of U.S. Provisional Application No. 62/517,882, entitled DETECTION AND BLOCKING OF WEB TRACKERS FOR MOBILE BROWSERS, and filed on Jun. 10, 2017 by inventors Scot Robinson, Patrick Conlin, Jules Panopolous and Julie Mar-Spinola, the contents of which are hereby incorporated by reference.

This application claims benefit of US Provisional Application No. 62/480,453, entitled ADVANCED MALWARE WARNING SYSTEM AND METHOD, and filed on Apr. 2, 2017 by inventors Scot Robinson, Patrick Conlin, Jules Panopolous, Sang Hui Michael Kim and Julie Mar-Spinola, the contents of which are hereby incorporated by reference.

This application claims benefit of U.S. Provisional Application No. 62/412,034, entitled ADVANCED MALWARE WARNING SYSTEM AND METHOD, and filed on Oct. 24, 2016 by inventors Michael Godlewski, Geoffrey House, Winnie Tong, Rudolph Mutter, Bay Lee Feore, Timothy Shipman, Anthony Scherba, Lee McDole, Alexander Lin Kremer, Julie Mar-Spinola, Scot Robinson, Patrick Conlin, Jules Panopolous and Sang Hui Michael Kim, the contents of which are hereby incorporated by reference.

This application is a continuation-in-part of U.S. patent application Ser. No. 15/069,981, entitled MALWARE WARNING, and filed on Mar. 15, 2016 by inventors Michael Godlewski, Geoffrey House, Winnie Tong, Rudolph Mutter, Bay Lee Feore, Timothy Shipman, Anthony Scherba, Lee McDole, Alexander Lin Kremer and Julie Mar-Spinola, the contents of which are hereby incorporated by reference.

U.S. patent application Ser. No. 15/069,981 claims benefit of U.S. Provisional Application No. 62/159,862, entitled SECURE BROWSER APPLICATION, and filed on May 11, 2015 by inventors Michael Godlewski, Geoffrey House, Winnie Tong, Rudolph Mutter, Bay Lee Feore, Timothy Shipman, Anthony Scherba and Julie Mar-Spinola, the contents of which are hereby incorporated by reference.

FIELD OF THE INVENTION

The present invention relates to computer security and privacy.

BACKGROUND OF THE INVENTION

Mobile devices, especially smartphones, often connect to the Internet through insecure connections, generally when the mobile devices are roaming. Insecure connections pose security and privacy risks. Insecure connections may introduce malware into a mobile device, and may leak private user data. If the mobile device user is part of an organization or enterprise, and uses his/her mobile device for such entity's matters, the security and privacy risks can spread to the entire organization or enterprise.

It would thus be of advantage to provide a web browser for a mobile device that provides a secure connection, regardless of where the mobile device is located. It would also be of advantage to provide a web browser for a mobile device that blocks uniform resource locators (URLs) for web pages that contain potential malware. It would also be of advantage to provide a web browser for a mobile device that blocks trackers that make use of user behavior to push ads and content, and to compile analytics.

SUMMARY

Embodiments of the present invention provide secure and private web browsers that protect users from the risks of insecure connections and from malware, and that ensure user privacy by blocking trackers and by preventing logging of user browsing histories.

There is thus provided in accordance with an embodiment of the present invention a mobile web browser embedded in a smartphone operative to open a secure and private session with a web server on the Internet via one or more cell towers, using a mobile IP address of the smartphone, the mobile web browser including a virtual private network (VPN) connector operative to connect the smartphone to a secure VPN server and to establish a virtual IP address for the smartphone, the virtual IP address corresponding to the location of the VPN server; a switch operable to change a current IP address of the smartphone used by the mobile web browser from a non-VPN mobile IP address to the virtual IP address of the VPN server, in a seamless manner without interrupting a current session with a web server; a URL content scanner causing a URL of a requested web page, input by a user of the smartphone, to be scanned for presence of potential malware prior to loading the requested web page by the mobile web browser; a URL blocker, conditionally warning the user that the requested web page is unsafe, if the URL content scanner detects presence of potential malware; a tracker scanner scanning the requested web page loaded by the mobile web browser to detect scripts in the web page, for each detected script comparing the script content with a list of URL connections to detect trackers in the script, each URL connection being associated with a corresponding tracker, and storing the detected trackers on the mobile device; and a tracker blocker displaying the stored trackers to a user, enabling the user to selectively block one or more of the displayed trackers, and reloading the requested web page, including, for each selected tracker to block, rejecting the URL connection corresponding to the selected tracker.

There is additionally provided in accordance with an embodiment of the present invention a non-transitory computer readable medium storing instructions, which, when executed by a processor of a mobile device, cause the processor to perform a method of secure and private web browsing, including connecting the mobile device to a secure VPN server, establishing a virtual IP address for the mobile device, the virtual IP address corresponding to the location of the VPN server; changing a non-VPN IP address of the mobile device to the virtual IP address of the VPN server, during a current session between the mobile device and a web server, in a seamless manner without interrupting the current session, receiving a URL of a requested web page, input by a user of the mobile device; prior to loading the requested web page, causing the received URL to be scanned for presence of potential malware; conditionally warning the user that the requested web page is unsafe, if the causing to be scanned detects presence of potential malware in the web page, subsequent to loading the requested web page; scanning the web page to detect scripts in the web page; for each detected script, comparing the script content with a list of URL connections to detect trackers in the script, each URL connection being associated with a corresponding tracker; storing the detected trackers on the mobile device; displaying the stored trackers to a user; enabling the user to selectively block one or more of the displayed trackers; and subsequent to the enabling, reloading the requested web page, including, for each selected tracker to block, rejecting the URL connection corresponding to the selected tracker.

BRIEF DESCRIPTION OF THE DRAWINGS

The present invention will be more fully understood and appreciated from the following detailed description, taken in conjunction with the drawings in which:

FIG. 29 is a screen shot of aggregate pass/fail scan results from a plurality of different scanners, in accordance with an embodiment of the present invention;

FIG. 38 is a screen shot of a web page with tracker detection, before trackers are blocked, in accordance with an embodiment of the present invention;

FIG. 39 is a screen shot of on/off controls for turning tracker blocking on and off, in accordance with an embodiment of the present invention;

FIG. 40 is a screen shot of a web page that is reloaded after trackers are blocked, in accordance with an embodiment of the present invention;

For reference to the figures, the following table of elements and their numerals is provided. Similarly numbered elements represent elements of the same type, but they need not be identical elements.

Table of elements in the figures

| Element | Description |
| --- | --- |
| 100 | mobile device |
| 110 | mobile device processor |
| 120 | web browser |
| 121 | VPN connector |
| 122 | switch |
| 124 | URL content scanner |
| 125 | URL blocker |
| 127 | tracker scanner |
| 128 | tracker blocker |
| 129 | private tab manager |
| 130 | touch-enabled input/output module |
| 135 | touch-based keyboard |
| 140A | first warning generator |
| 140B | second warning generator (optional) |
| 140C | third warning generator |
| 150 | URL database |
| 210 | cell tower |
| 220 | Internet gateway |
| 230 | web server |
| 240 | VPN server |
| 250 | virus scan engine(s) |
| 260 | evaluator server |
| 265 | QA database |
| 270 | search engine(s) |
| 305 | web page |
| 310 | URL |
| 315 | secure connection control and indicator |
| 320 | browser tabs control indicator |
| 325 | tracker control and indicator |
| 330 | scanner control for scanning a currently displayed web page |
| 335 | bookmarking control and indicator |
| 340 | VPN connection control |

Table of elements in the figures

| Element | Description |
| --- | --- |
| 345 | VPN location control and indicator |
| 350 | secure connection indicator |
| 355 | VPN location selector |
| 360 | scan results alert bar |
| 365 | tracker on/off controls |
| 371-378 | browser controls |
| 381-386 | configurable settings for a secure web browser |
| 410-460 | display screens |
| 500 | middleware server computing device |
| 510 | middleware server processor |
| 550 | URL database |
| 560 | tracker database |

Elements numbered in the 1000's are operations of flow charts.

DETAILED DESCRIPTION

High-Level Overview

The following discussion is a high-level overview of some of the components and functionalities of a secure and private web browser in accordance with an embodiment of the present invention. These components are first described briefly in this overview section, so that the reader may appreciate the nature of the secure and private web browser, and are subsequently described fully in the ensuing sections dealing with the open VPN connector, the malware scanner, the tracker blocker and the privacy manager.

Figure 1:
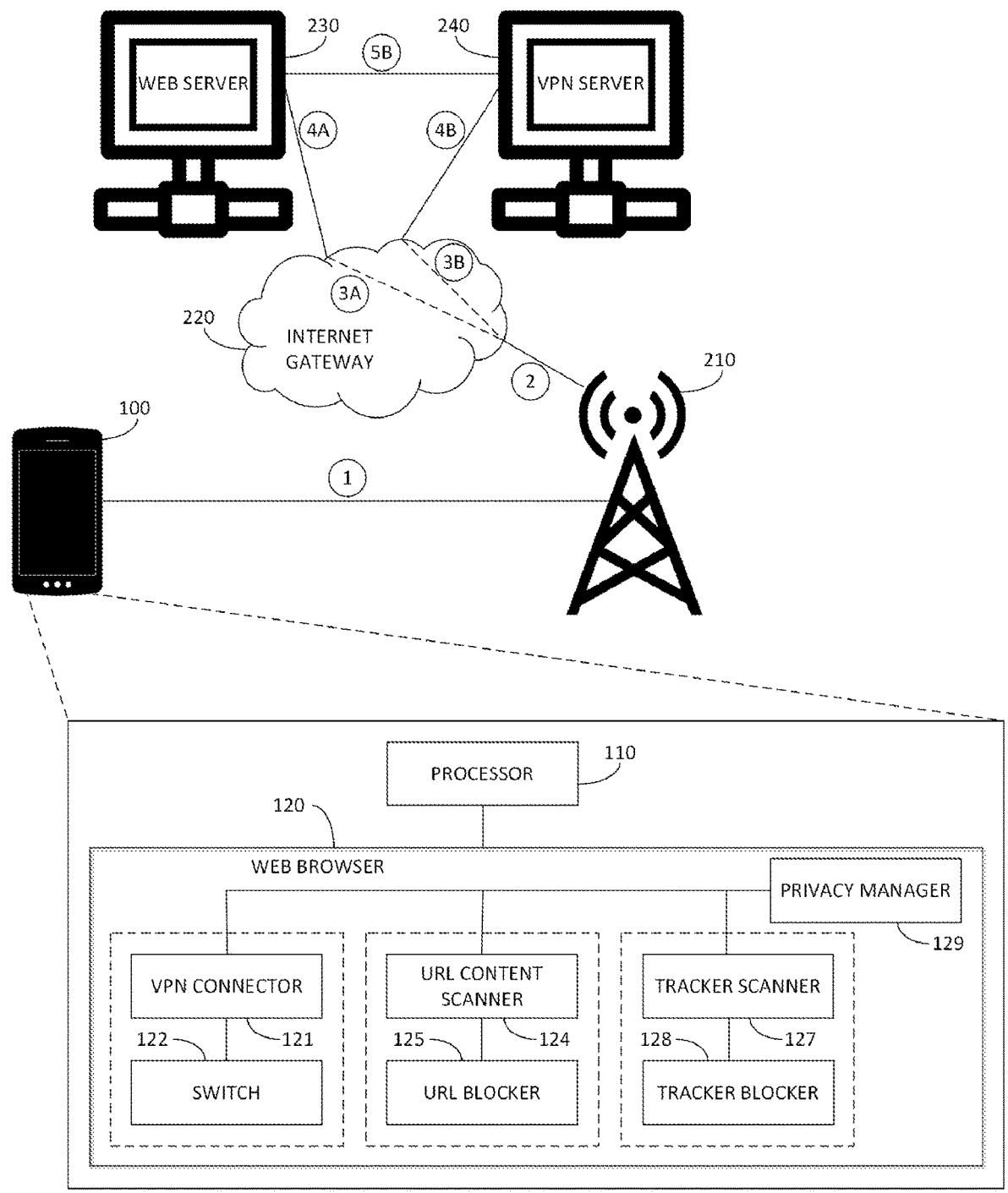
FIG. 1 is a simplified block diagram of a secure and private web browser for a mobile device, in accordance with an embodiment of the present invention.

Reference is made to FIG. 1, which is a simplified block diagram of a secure and private web browser for a mobile device, in accordance with an embodiment of the present invention. FIG. 1 shows a mobile device 100 including a processor 110 that controls a secure and private web browser 120. Mobile device 100 also includes a data bus and memory modules that store data and instructions; the memory modules being accessible by processor 110, via the data bus, for processor 110 to perform read and write operations. Web browser 120 may be ANDROID®-based or SAFARI®-based.

In accordance with an embodiment of the present invention, mobile device 100 is an electronic computing device, including inter alia smartphones, tablets, laptops, medical devices, Internet of things devices, and computers in vehicles, which have processors, memory and communication interfaces. Mobile device 100 may be programmed and configured to perform the methods of the present invention described below. Depending on the operating system of mobile device 100, standard appropriate programming languages for developing and testing applications, including application program interfaces (APIs), pop-up windows and animations, may implement the methods of the present invention.

Mobile device 100 connects to the Internet via a cell tower 210 and an Internet gateway 220. It will be appreciated by those skilled in the art that the connection between mobile device 100 and Internet gateway 220 generally includes more components than shown in FIG. 1. Thus, very briefly, for a General Packet Radio Service (GPRS) network, mobile device 100 communicates with a base transceiver station (BTS) via an over-the-air interface. A base station controller (BSC) switching module provides handoff functions and power level control in base transceiver stations. A BSC is controlled by a mobile switching center (MSC), which performs functions of a landline network switching node, including search, signal path switching and processing of supplementary services. The BSC controls the interface between a serving GPRS support node (SGSN) and the BTS. An SGSN is responsible for delivery of data packets to and from mobile device 100 within a service area. A gateway GPRS support node (GGSN) acts as Internet gateway 220.

Corresponding components are present within a Code Division Multiple Access (CDMA) communication network, and within an IEEE 802.11b WiFi communication network.

The present invention applies to GPRS, CDMA, WiFi and other communication networks, in existence today and in the future.

Web browser 120 initiates sessions with web server 230, and thereafter loads web pages from web server 230 and presents the web pages on mobile device 100 for user access and interaction. FIG. 1 also shows a virtual private network (VPN) server 240. VPN server 240 provides a secure encrypted data connection between web server 120 and VPN server 240.

Web browser 120 includes several components, as follows. A VPN connector 121 operative to connect mobile device 100 to VPN server 240 and to establish a virtual IP address for mobile device 100, the virtual IP address corresponding to the location of VPN server 240.

A switch 122 is operative to change the current IP address of mobile device 100, used by mobile web browser 120, from a non-VPN mobile IP address to the virtual IP address of VPN server 240, in a seamless manner; i.e., without interrupting a current session between mobile browser 120 and web server 230. Referring to FIG. 1, when mobile device 100 uses a non-VPN IP address, communication between mobile device 100 and web server 230 goes back and forth along the path 1-2-3A-4A. When mobile device uses a VPN IP address, switch 122 switches the connection between mobile device 100 and web server 230 so that communication between mobile device 100 and web server 230 goes back and forth along the alternate path 1-2-3B-4B-5B.

Web browser 120 ensures that packets are encrypted along the path 1-2-3B-4B. Encryption along the segment 4B-5B depends upon web server 230.

A URL content scanner 124 is operative to cause a URL of a requested web page, input by a user of mobile device 100, to be scanned for presence of potential malware, prior to loading the requested web page by mobile device 100.

A URL blocker 125 is operative to conditionally warn the user of mobile device 100 that the requested web page may be unsafe, if URL content scanner 124 detects presence of potential malware at the URL.

A tracker scanner 127 is operative to scan the requested web page loaded by web browser 120 to detect scripts in the web page. For each detected script, tracker scanner 127 compares the script content with a list of URL connections, to detect trackers embedded in the script, where each URL connection in the list is associated with a corresponding tracker. Tracker scanner 127 stores the detected trackers in mobile device 100. In an embodiment of the present invention, each stored tracker is categorized as being (i) an advertising tracker, (ii) an analytics tracker, (iii) a content tracker, or (iv) a social tracker.

A tracker blocker 128 is operative to display the stored trackers to the user of mobile device 100, and enables the user to selectively block one or more of the displayed trackers. Tracker blocker 128 then reloads the requested web page, rejecting the URL connection corresponding to each tracker selected by the user for blocking.

A privacy manager 129 is operative to disable recording of the requested web page within a history log of web browser 120, when web browser 120 opens the web page within a private tab.

Figure 2:
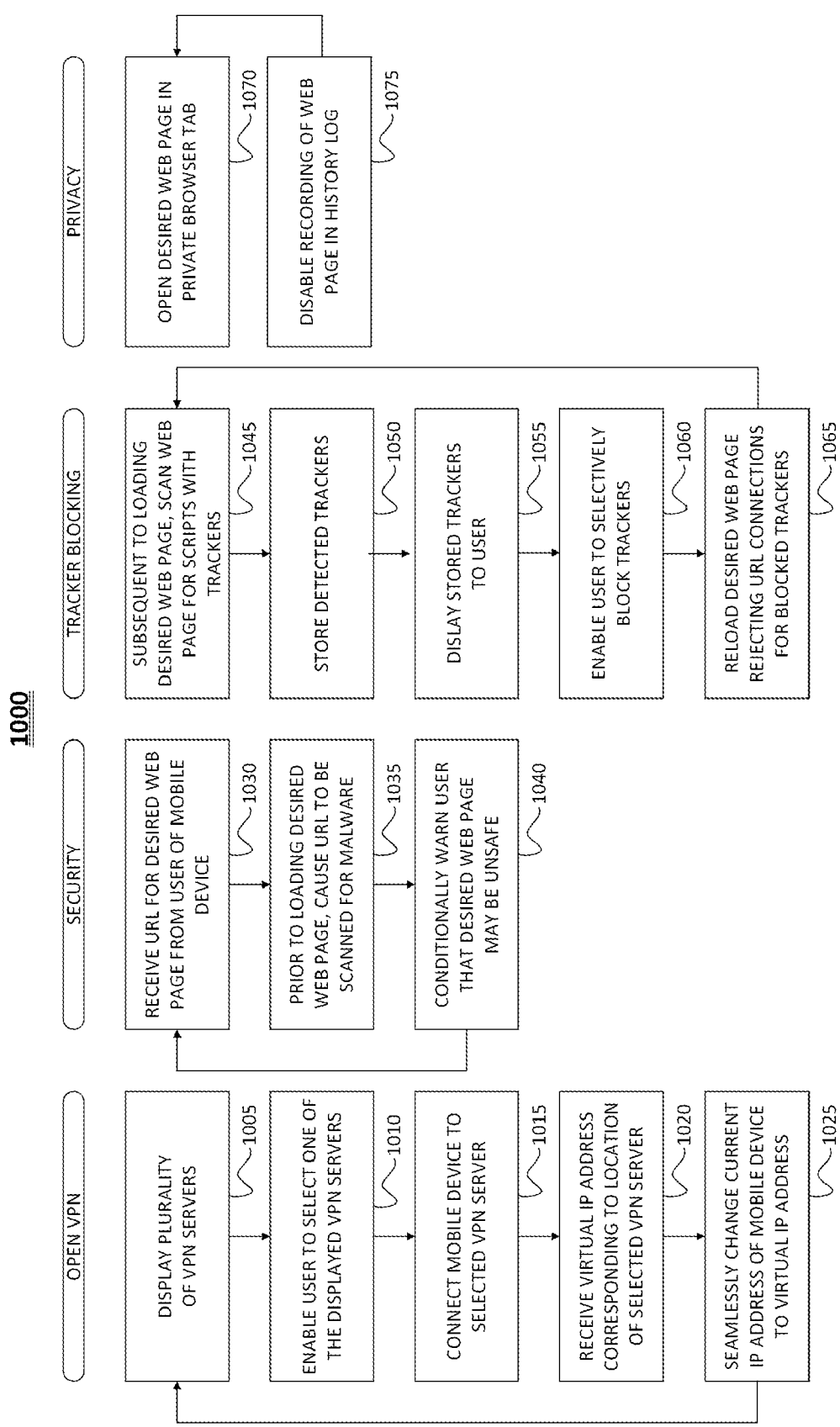
FIG. 2 is a simplified flowchart of a method for secure and private browsing, in accordance with an embodiment of the present invention.

Reference is made to FIG. 2, which is a simplified flowchart 1000 of a method for secure and private browsing, in accordance with an embodiment of the present invention. Flowchart 1000 shows four different security-related and privacy-related processes performed by web browser 120. Flowchart 1000 is divided into four columns. The leftmost column includes operations performed by VPN connector 121 and switch 122. The second-from-leftmost column includes operations performed by URL content scanner 124 and URL blocker 125. The second-from-rightmost column includes operations performed by tracker scanner 127 and tracker blocker 128. The rightmost column includes operations performed by privacy manager 129.

At operation 1005 web browser 120 displays a list of a plurality of secure VPN servers to a user of mobile device 100. Each VPN server in the list is at a different location. At operation 1010 web browser 120 enables the user to select one of the displayed VPN servers. At operation 1015 web browser 120 connects mobile device 100 to the selected VPN server 240. VPN server 240 provides a virtual IP address corresponding to the location of the selected VPN server 240, and at operation 1020 mobile device 100 receives the virtual IP address. At operation 1025 web browser 120 changes the current IP address of mobile device 100 to the virtual IP address, in a seamless manner; i.e., without interrupting a current session between web browser 120 and web server 230. Thereafter, if the user wishes to select a different VPN server, processing returns to operation 1005. The user may instead wish to disconnect from the VPN server, in which case web browser 120 switches back to the non-VPN IP address of mobile device 100.

At operation 1030 web browser 120 receives a URL entered by a user, to access a desired web page of web server 230. At operation 1035, prior to loading the desired web page, web browser 120 causes the URL to be scanned for the presence of potential malware. At operation 1040, web browser 120 conditionally warns the user that the desired web page may be unsafe, if operation 1035 discovers the presence of potential malware. When the user wishes to open another web page, processing returns to operation 1030.

At operation 1045, subsequent to loading the desired web page, web browser 120 scans the web page for the presence of scripts that contain trackers. At operation 1050 web browser 120 stores the detected trackers. At operation 1055 web browser 120 displays the stored trackers to the user. At operation 1060 web browser 120 enables the user to selectively block one or more of the displayed trackers. At operation 1065 web browser reloads the desired web page, rejecting each URL connection to trackers within the web page that are blocked. When the user opens another web page, processing returns to operation 1045.

At operation 1070 the user of mobile device instructs web browser to open a desired web page within a private browser tab. At operation 1075 web browser 120 disables recording of the desired web page within a browsing history log. When the user opens another web page within the private browser tab, processing returns to operation 1070.

I. Open VPN: VPN Connector 121 and Switch 122

Figure 3:
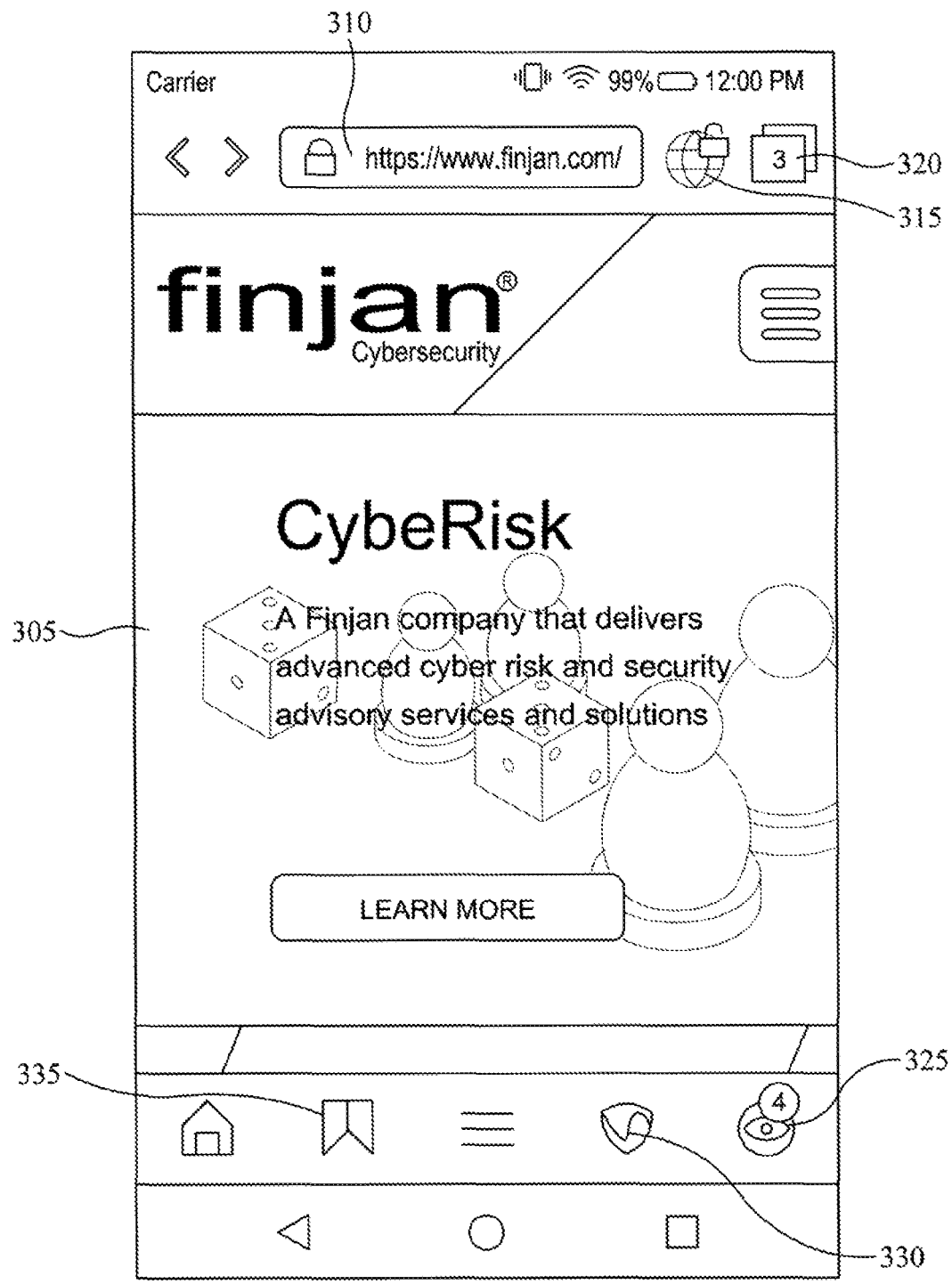
FIG. 3 is a screen shot of the web browser of FIG. 1 displaying a web page of a web server, and showing a secure connection control and indicator indicating that the mobile device is currently not connected to the web server via a VPN server, in accordance with an embodiment of the present invention.

Reference is made to FIG. 3, which is a screen shot of secure and private web browser 120 displaying a web page 305 of web server 230, and showing a user interface having a globe-shaped secure connection control and indicator 315 indicating that web browser 120 is currently not connected to web server 230 via a VPN server, in accordance with an embodiment of the present invention. FIG. 3 shows web page 305 being displayed by web browser 120. A URL 310 for web page 305 is "https://www.finjan.com". Globe-shaped secure connection control and indicator 315 is dimmed, indicating that the current connection between web browser 120 and web server 230 at "finjan.com" is not secure; i.e., the current connection is not using a VPN server. A browser tabs control and indicator 320 shows that three browsing tabs are currently open. A tracker control and indicator 325 shows that four trackers have been identified in web page 305. A scanner control 330 enables an immediate scan of web page 305 for the presence of potential malware. A bookmarking control and indicator 335 enables bookmarking web page 305 for ease of future access, and is partially darkened, indicating that web page 305 is not bookmarked.

Figure 4:
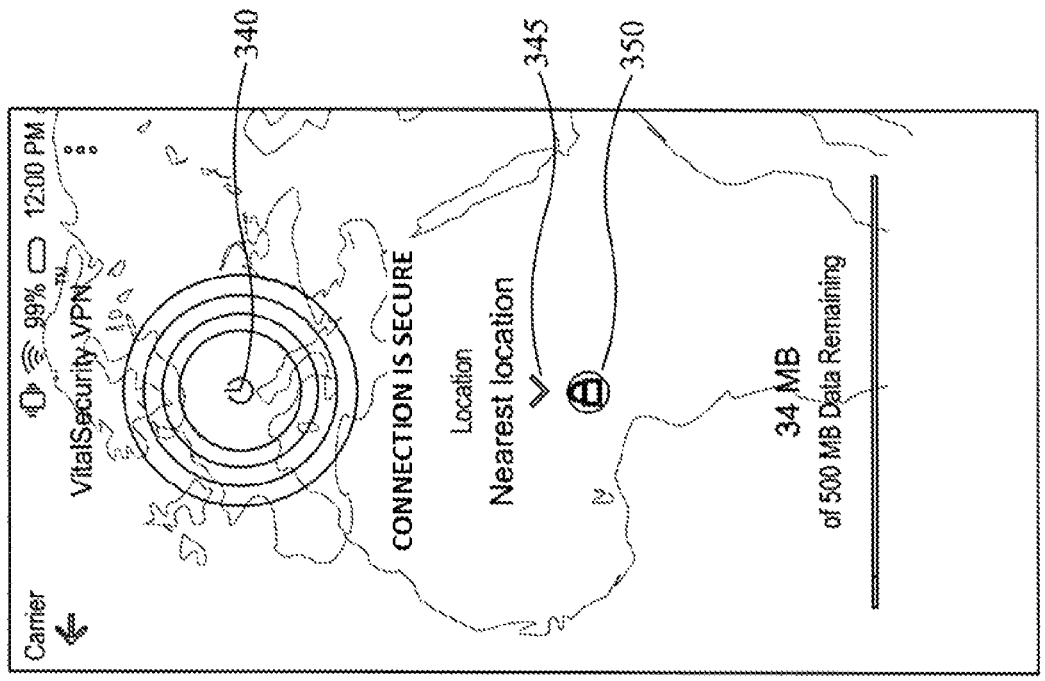
FIG. 4 is a screen shot of a VPN user interface within the web browser of FIG. 1, showing that the web browser is currently not connected to the web server via a VPN server, and showing a VPN connection control enabling a user to connect the mobile device to a VPN server nearest to the device's location, in accordance with an embodiment of the present invention.

Reference is made to FIG. 4, which is a screen shot of a VPN user interface within web browser 120, showing that web browser 120 is currently not connected to web server 230 via a VPN server, and showing a VPN connection control 340 enabling a user to connect the mobile device to a VPN server, in accordance with an embodiment of the present invention. A VPN location control and indicator 345 shows that the user may connect to a VPN server located nearest to the user's current location.

Figure 5:
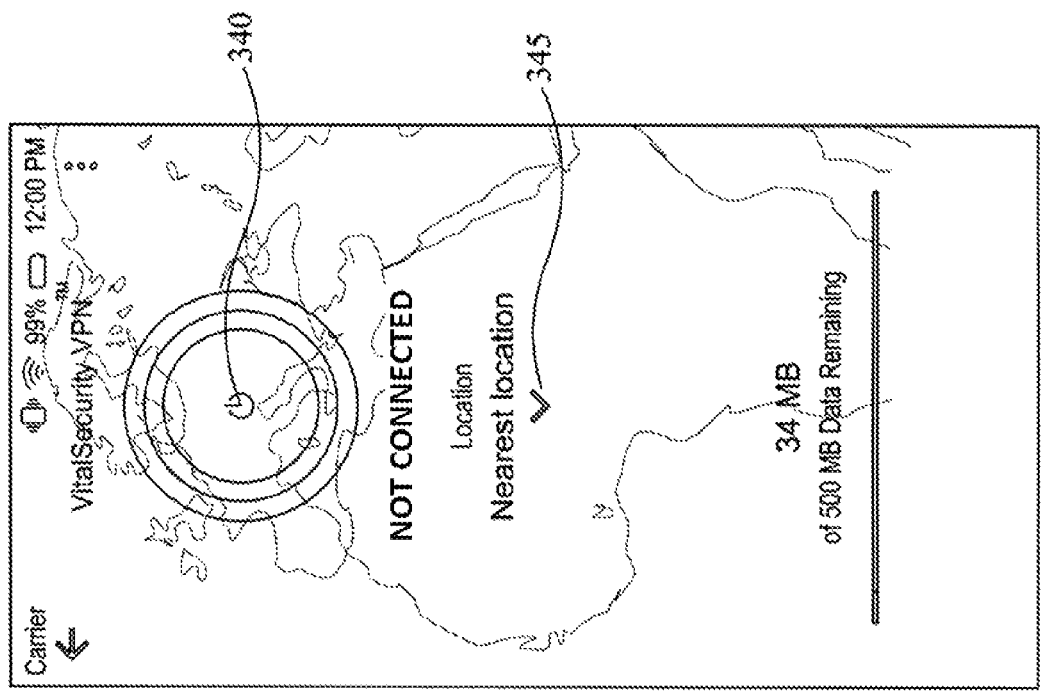
FIG. 5 is a screen shot of the VPN user interface of FIG. 4, showing that the web browser is now connected to the web server via a VPN server that is nearest to the user's location, in accordance with an embodiment of the present invention.

Reference is made to FIG. 5, which is a screen shot of the VPN user interface of FIG. 4, showing that web browser 120 is now connected to web server 230 via a VPN server that is located nearest to the user's location, in accordance with an embodiment of the present invention. A secure connection indicator 350 shows a lock, indicating that the current connection between web browser 120 and web server 230 is secure; i.e., the current connection is via a VPN server.

Figure 6:
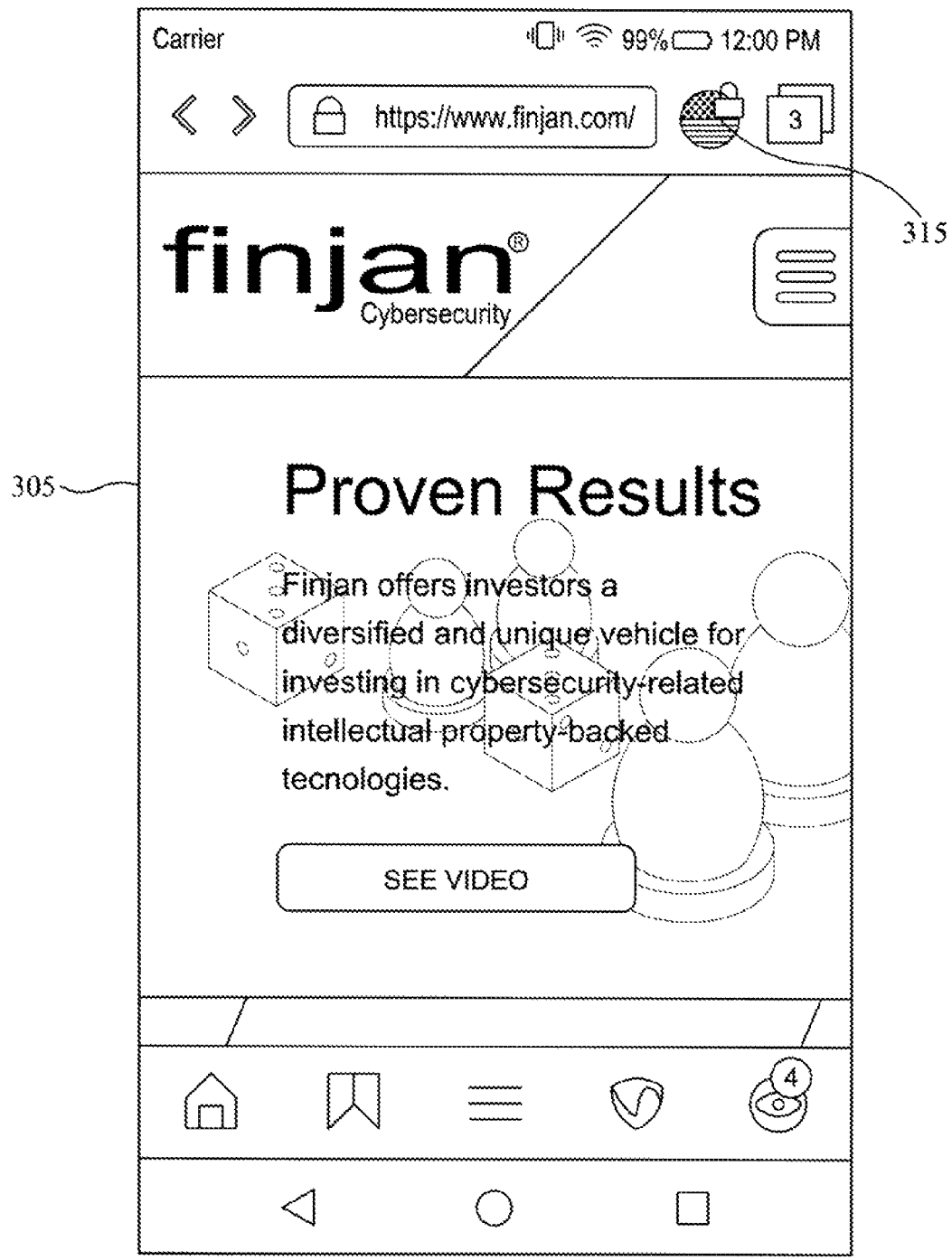
FIG. 6 is a screen shot of the web browser of FIG. 1 with a secure connection control and indicator indicating that the web browser is now connected to the web server via a VPN server, in accordance with an embodiment of the present invention.

Reference is made to FIG. 6, which is a screen shot of secure and private web browser 120 displaying web page 305 of web server 230, with globe-shaped secure connection control and indicator 315 lit up, indicating that web browser 120 is now connected to web server 230 via a VPN server 240, in accordance with an embodiment of the present invention. Connection control and indicator 315 shows stars-and-stripes indicating that the VPN server via which mobile device 100 is connected, is located in the United States.

Figure 7:
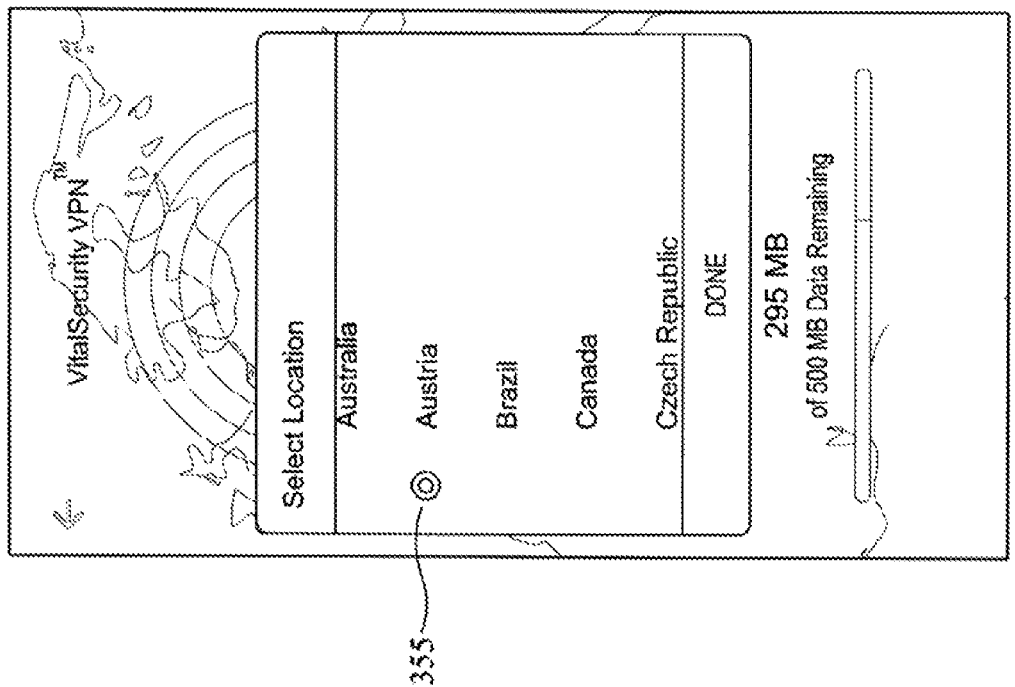
FIG. 7 is a screen shot of a VPN user interface within the web browser of FIG. 1, enabling a user to connect the web browser to a VPN server at a desired location, in accordance with an embodiment of the present invention.

Reference is made to FIG. 7, which is a screen shot of a VPN user interface within web browser 120, enabling a user to connect web browser 120 to a VPN server 240 at a desired location, in accordance with an embodiment of the present invention. A VPN location selector 355 enables the user to select locations in Austria, Brazil, Canada, etc. As shown in FIG. 7, the user has selected to connect to a VPN server 240 located in Austria.

Figure 8:
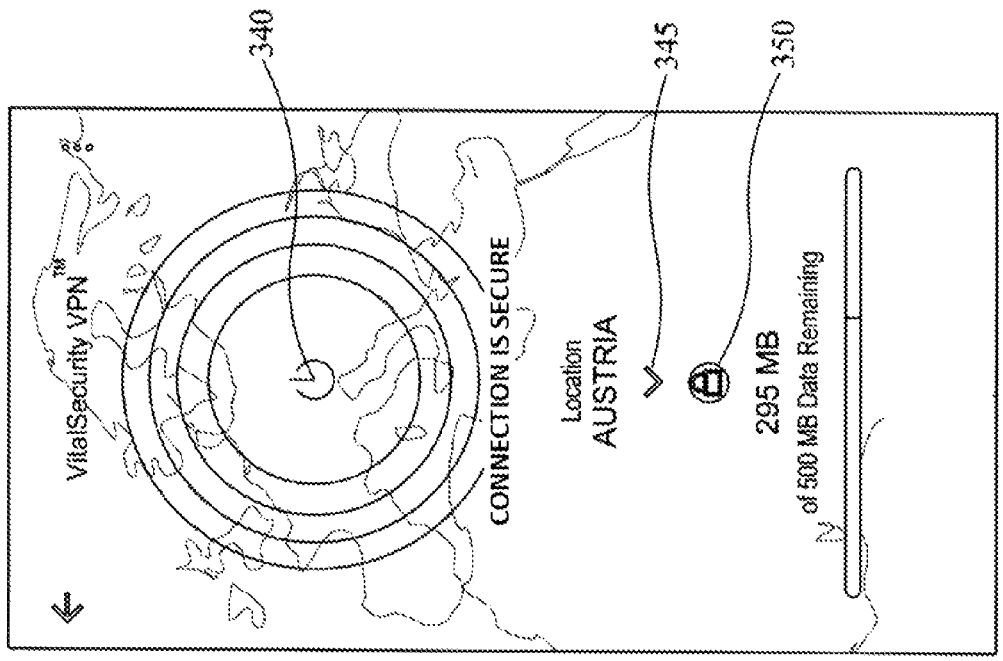
FIG. 8 is a screen shot of the VPN user interface of FIG. 4, showing that the web browser is now connected to the web server via a VPN server in the desired location, in accordance with an embodiment of the present invention.

Reference is made to FIG. 8, which is a screen shot of the VPN user interface of FIG. 4, showing that web browser 120 is currently connected to web server 230 via a VPN server located in Austria, in accordance with an embodiment of the present invention.

II. Malware Scanner: URL Content Scanner 124 and Blocker 125

Web browsers for computing devices generally operate by loading and displaying web pages corresponding to uniform resource locators (URLs) on the computing devices. These web pages may contain active scripts, such as Java scripts and Visual Basic scripts, which run on the computing devices when they are loaded. Some active scripts may be malicious and can harm the computing devices and the applications and data stored therein, and can expose users' and enterprise private data.

Users are adept today at touch-based input for many kinds of computing devices, and are able to perform tasks such as touch-keystrokes at a rapid-fire rate, even with small touch areas. This makes it difficult for users to make an abrupt stop when a malware application is encountered, and prevent its activation. Even though a user has installed an anti-virus application, and a malware warning message appears, the user may react "one touch too late", after the malware has been launched.

The damage caused by malware may be enormous. Malware can wipe out a smartphone or tablet computer, and/or extract sensitive data enabling a hacker to cause financial or other harm.

Sometimes an anti-virus application flags an unrecognized web site, application or file as being suspicious, when a user knows that the application or file is safe, a condition referred to as a "false positive". In such case, the user intentionally ignores a malware warning message.

Embodiments of the present invention provide warning modules, systems and methods that generate important information about specific malware that a user encounters, and that require a confirmatory action from the user that is different than a simple touch, prior to accessing a dangerous web site, application or file, thus preventing the "one touch too late" catastrophe.

The present invention may be embodied inter alia entirely on a mobile device, or alternatively with use of a middleware server computer. The present invention may be embodied for use by a secure web browser, to prevent malicious content from being opened by the browser. The present invention may also be embodied to provide malware warnings for search results obtained from one or more search engines, to protect a mobile device against malicious content that is present in search results.

Embodiments of the present invention employ one or more scan engines to scan URL content, and employ a database which stores scan results of URL content so as to eliminate the need to re-scan the same content repeatedly. Each scan result has an expiration date, so as to force refresh of scans from time to time.

Embodiments of the present invention include an evaluator server, which manages behavioral analysis of dangerous malware content that is discovered by the present invention. Preferably the behavioral analysis is conducted off-line, so as not to hinder the flow of content to a user during run-time. Results of the behavioral analysis are stored in a database.

One usage scenario of the present invention is as follows.

A user of a mobile device requests a web page or a search result.

The mobile device passes the request to a middleware server.

The middleware server queries a database to determine if the requested web page has been evaluated recently.

If the requested web page is not present in the database, or if the web page is present but its evaluation has expired, then request a scan of the web page from one or more scan engines, save the scan results in the database, and derive a threat level of the web page from the scan results.

For every $N^{th}$ such request, invoke an evaluator server to run a behavioral analysis of the requested web page.

Send a malware report including the scan results to the mobile device.

If the web page has a dangerous threat level, then the mobile device does not allow the user to open the page until the user performs a confirmatory action to proceed and open the page.

If and when the mobile device opens the requested web page, the mobile device provides the user with summary results. The user can press on the summary results to bring up a complete scan report.

Client-Based Embodiment

Figure 9:
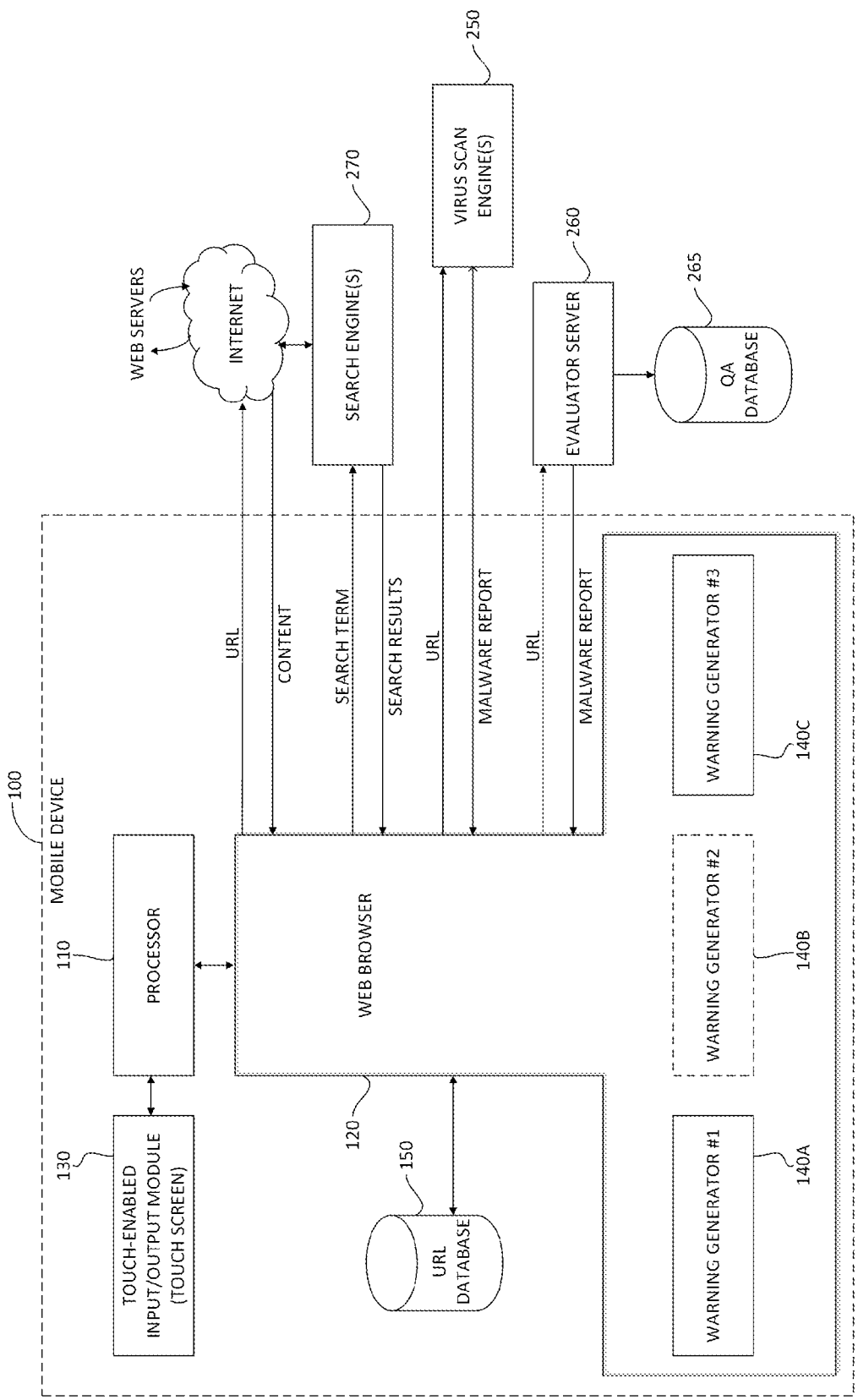
FIG. 9 is a simplified diagram of a client-based embodiment of a malware warning module for URLs, in accordance with an embodiment of the present invention.

Reference is made to FIG. 9, which is a simplified diagram of a client-based embodiment of a malware warning module for URLs, in accordance with an embodiment of the present invention. Shown in FIG. 9 is mobile device 100 with processor 110, web browser 120 and a touch-enabled input/output (I/O) module 130, such as a touch screen.

I/O module 130 provides for touch and gesture input to processor 110, in response to a user touching a surface of the device with an object such as a finger, or sliding his finger along the surface of the device to perform a gesture such as the familiar "swipe" gesture.

Shown in FIG. 9 are three warning generators, 140A, 140B and 140C. Warning generators 140A, 140B and 140C together provide a tri-warning system, to alert a user when he tries to access potentially malicious content. Warning generator 140A provides a simple warning e.g., that the web site being accessed is flagged as safe, suspicious or dangerous. Warning generator 140B provides detailed information about the web site being accessed, to supplement the simple warning provided by warning generator 140A. Warning generator 140C is invoked when the user nevertheless continues to try to access the web site. Warning generator 140C provides a warning message such as "Enter at your own risk", and requires a confirmatory action on the part of the user, such as a swipe gesture, in order to access the web site.

Detailed operation of these warning generators is described below. Warning generators 140A, 140B and 140C may be three separate modules, as shown in FIG. 9, they may be combined into fewer modules, or they may be separated into more modules.

Also shown in FIG. 9 is a URL database 150, which stores URLs and their scan results, as described below. URL database 150 may reside locally on mobile device 100, as shown in FIG. 9, or alternatively it may reside remote from mobile device 100.

Also shown in FIG. 1 are one or more virus scan engines 250, an evaluator server 260, a QA database 265, and one or more search engines 270. Scan engine(s) 250 scan content at a designated URL location for malicious or potentially malicious malware code. Scan engine(s) 250 may be a physical gateway capable of scanning content at a URL location, and/or may be a cloud-based content scanning service. Evaluator server 260 performs behavioral analysis of web pages for quality assurance (QA) and stores results in URL database 150 and in QA database 265, as described below with reference to FIG. 30. Generally, scan engine(s) 250 provide only pass/fail or grade/rating information indicating a threat level for a URL web page, whereas evaluator server 260 performs script behavioral analysis and provides security profile data including a list of suspicious operations performed by a URL web page. Behavioral analysis results in QA database 265 are reported to an administrator.

Use of evaluator server 260 enables behavioral analysis results to be stored in QA database 265 for later processing without impacting processing by scan engine(s) 250 in determining threat levels.

Search engine(s) 270 may be a physical or cloud-based search service, such as Microsoft BING®. Evaluator server 260 may be separate from search engine(s) 270, or may be part of search engine(s) 270.

In an embodiment of the present invention, web browser 120 interacts with scan engine(s) 250 and with evaluator server 260, transmitting URLs to scan engine(s) 250 and receiving malware reports from scan engine(s) 250, and transmitting URLs to evaluator server 260 and receiving malware reports from evaluator server 260.

Figure 10:
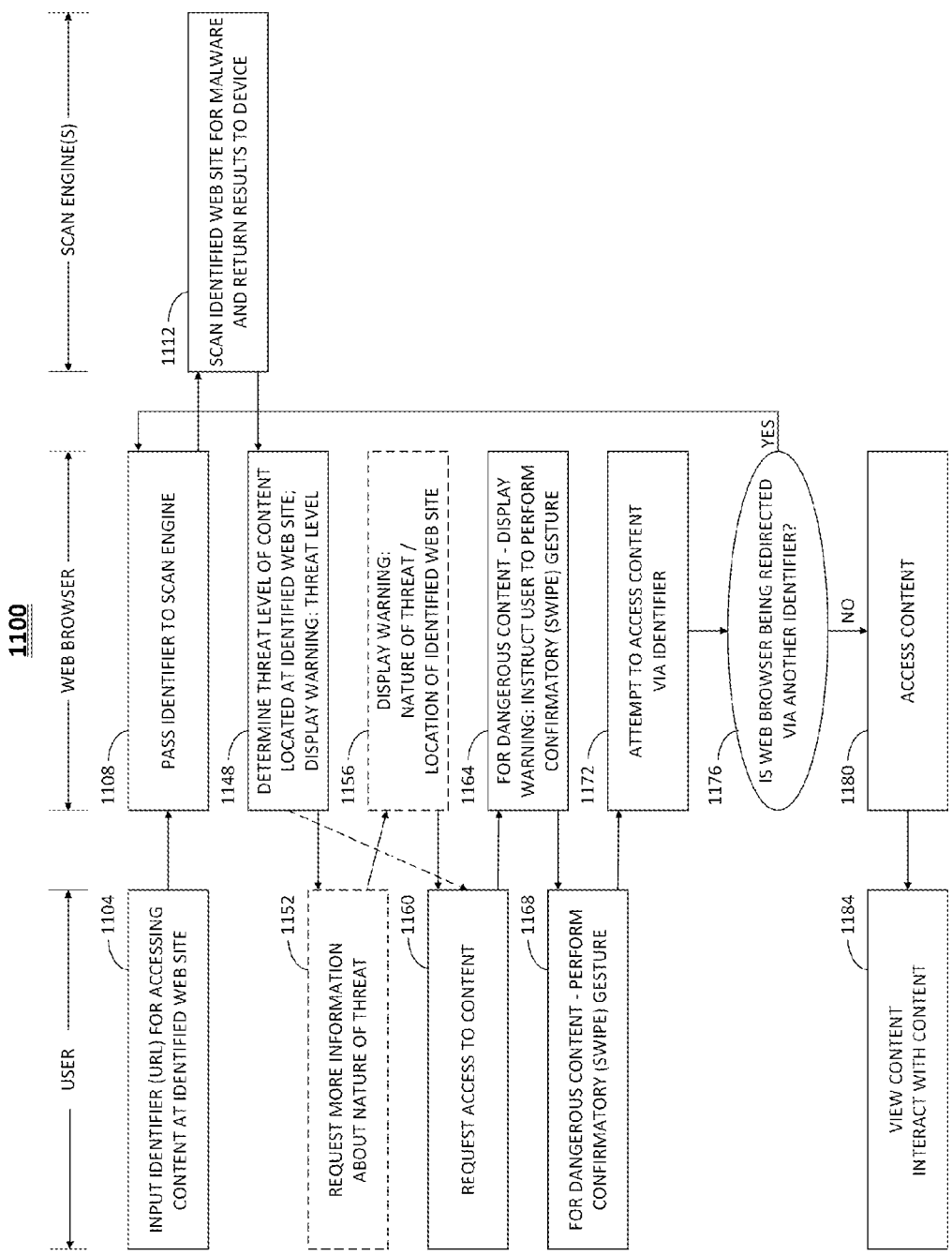
FIG. 10 is a simplified flowchart of a client-based method for malware warning for URLs, in accordance with an embodiment of the present invention.

Reference is made to FIG. 10, which is a simplified flowchart 1100 of a client-based method for malware warning for URLs, in accordance with an embodiment of the present invention. Flowchart 1100 is divided into three columns. The left column includes operations performed by a user of mobile device 100, the middle column includes operations performed by web browser 120, and the right column includes operations performed by scan engine(s) 250.

Figure 12:
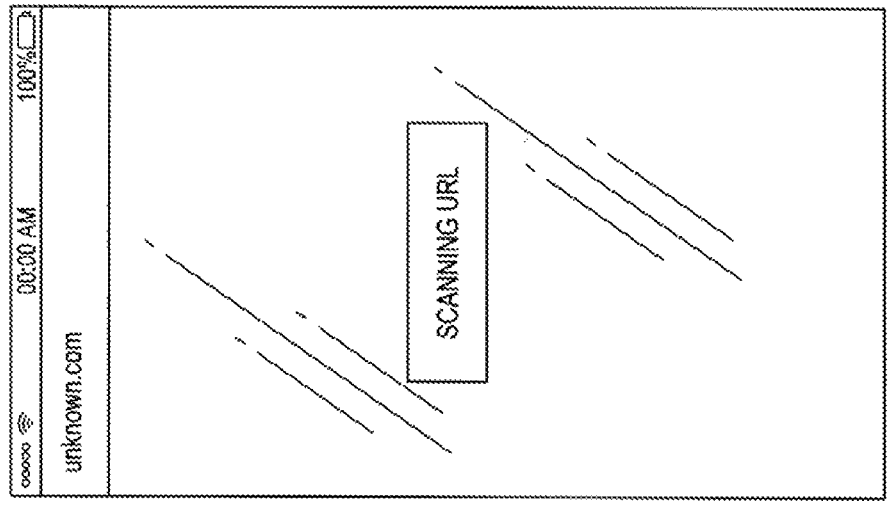
FIG. 12 is a screen shot showing that the user has input a specific identifier (i.e., "unknown.com"), in accordance with an embodiment of the present invention.
Figure 11:
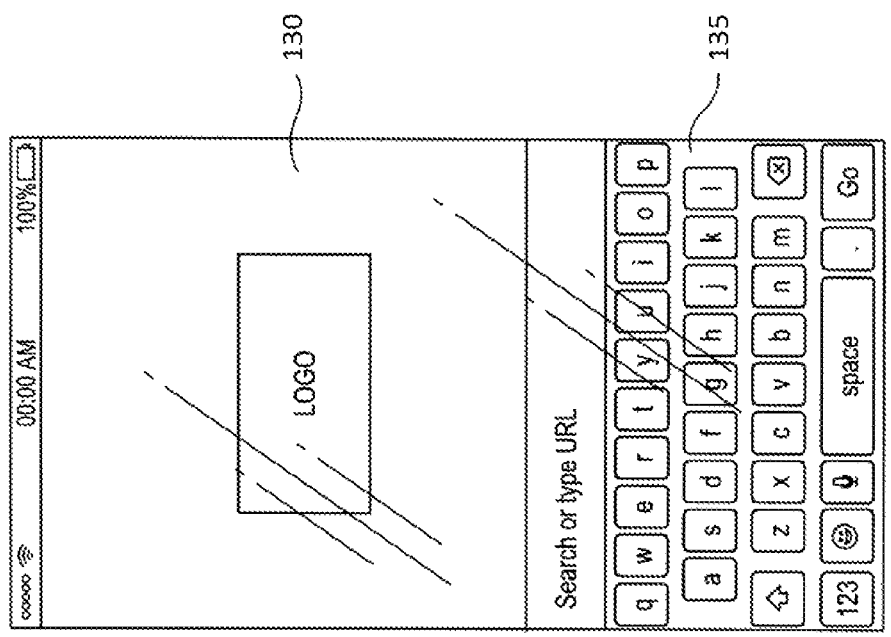
FIG. 11 is a screen shot of a simple interface display in which a user is prompted to enter a URL using a keyboard, in accordance with an embodiment of the present invention.

At the beginning of method 1100, web browser 120 prompts the user to enter an identifier, such as a URL, for accessing web content. In this regard, reference is made to FIG. 11, which is a screen shot of a simple interface display in which a user is prompted to enter a URL using a keyboard 135 displayed in I/O module 130, in accordance with an embodiment of the present invention. At operation 1104, the user enters an identifier for accessing content at a web site that is identified by the identifier. In this regard, reference is made to FIG. 12, which is a screen shot showing that the user has entered a specific identifier, namely, "unknown.com", in accordance with an embodiment of the present invention.

At operation 1108, web browser 120 passes the URL to scan engine(s) 250 for analysis. Alternatively, instead of invoking scan engine(s) 300, web browser 120 may consult URL database 150, which stores malware information for each of a plurality of URLs. If the specific URL input by the user does not reside in URL database 150, or if it does reside in URL database 150 but its information is out of date, e.g., more than 30 days old, only then does web browser 120 pass the URL to scan engine(s) 250 to perform a scan of the URL. When the specific URL input by the user does reside in URL database 150 and its information is up to date, user experience and efficiencies are enhanced by avoiding a scan by scan engine(s) 250.

Figure 13:
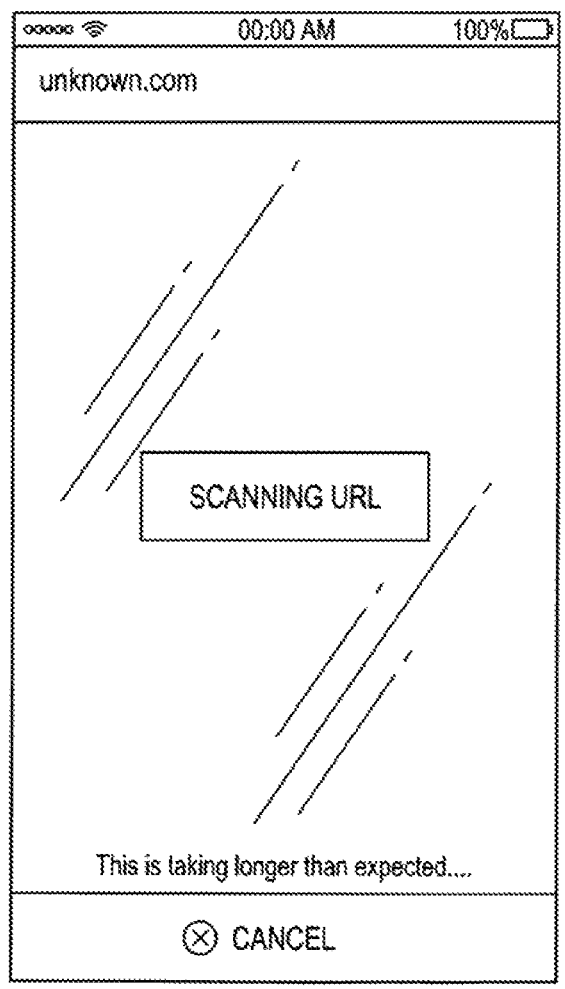
FIG. 13 is a screen shot showing a message, "This is taking longer than expected", displayed while a processor is waiting for scan results, in accordance with an embodiment of the present invention.

Operation 1108 may be performed inter alia by invoking remote or third-party scanners, such as the VirusTotal™ scanner at https://www.virustotal.com, using an API key. VirusTotal provides security results from many different scan engines. More time is required when the URL needs to be scanned, and web browser 120 may display a message to the user in response to which the user may either wait or cancel the scan. In this regard, reference is made to FIG. 13, which is a screen shot of a message, "This is taking longer than expected", displayed while web browser 120 is waiting for scan results, and a touch control to cancel the scan, in accordance with an embodiment of the present invention.

At operation 1112, scan engines(s) 250 scan the content at the URL, and return the results of the scan to web browser 120.

At operation 1148, warning generator 140A determines a threat level of the content located at the identified web site, based on the results received from scan engine(s) 250, and generates a first warning including the thus-determined threat level.

In accordance with one embodiment of the present invention, threat levels are categorized as being "SAFE", "SUSPICIOUS" and "DANGEROUS". Reference is made to FIG.

Figure 15:
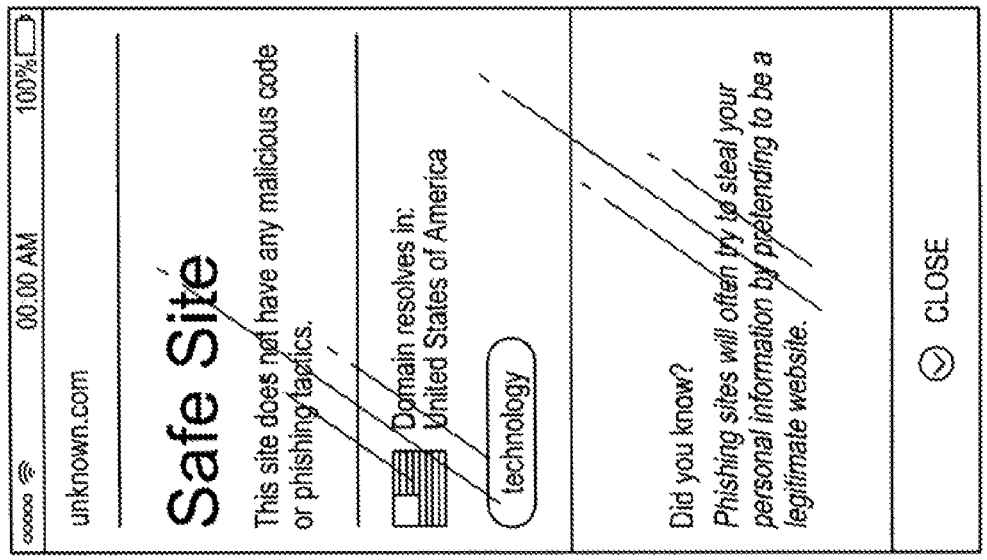
FIG. 15 is a screen shot of a message indicating that a "SAFE SITE" does not have any malicious code or phishing tactics, the location of the web site, and the type of website "technology", and a control to close the connection to the web site, in accordance with an embodiment of the present invention.

14, which is a screen shot of a threat level of "SAFE" for the web site "unknown.com", in accordance with an embodiment of the present invention. Reference is made to FIG. 15, which is a screen shot of a warning including the nature of a "SUSPICIOUS SITE" threat, a location of the web site, and the type of web site "news & media", and a control to close the connection to the web site, in accordance with an embodiment of the present invention. FIG. 15 shows that the web site is categorized as "technology" and resolves to a domain located in the United States.

Figure 16:
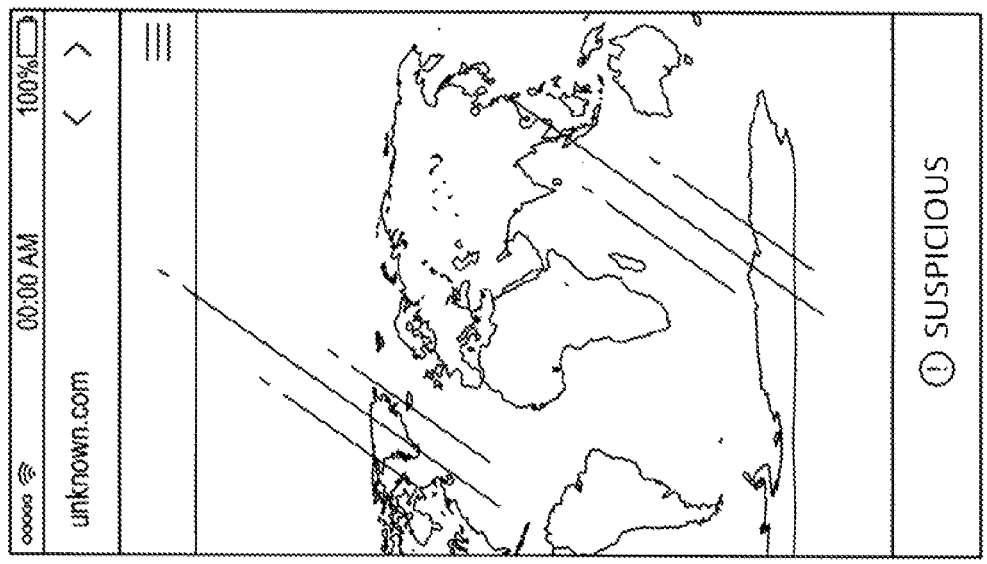
FIG. 16 is a screen shot of a threat level of "SUSPICIOUS" for a web site, in accordance with an embodiment of the present invention.

Reference is made to FIG. 16, which is a screen shot of a threat level of "SUSPICIOUS" for the website "unknown.com", in accordance with an embodiment of the present invention.

Figure 17:
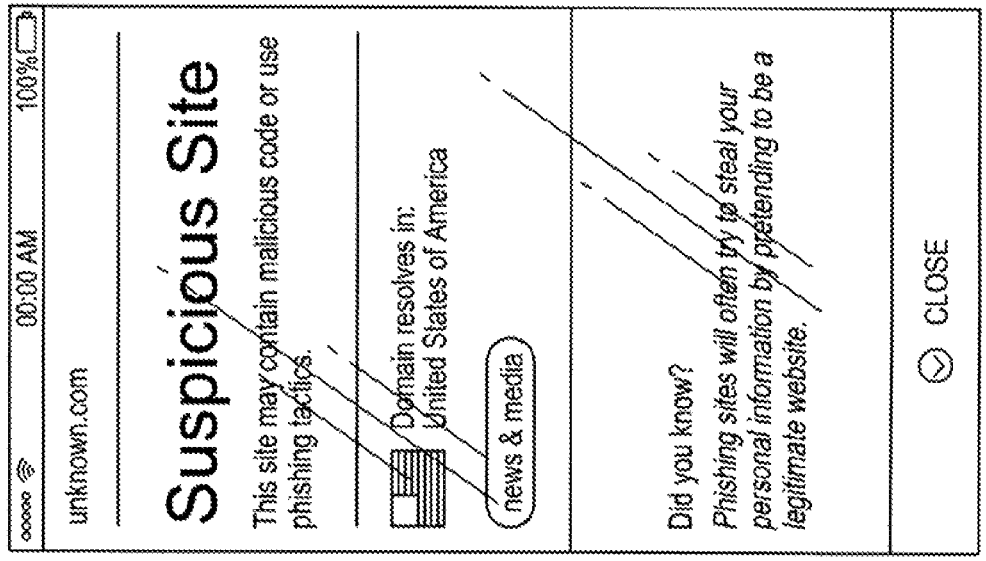
FIG. 17 is a screen shot of a warning including the nature of a "SUSPICIOUS SITE" threat, a location of the web site, and the type of web site "news & media", and a control to close the connection to the web site, in accordance with an embodiment of the present invention.

At operation 1152 the user requests more information about the nature of the threat. At operation 1156 warning generator 140B generates a second warning including the nature of the threat and the location of the identified web site. In this regard, reference is made to FIG. 17, which is a screen shot of a warning displayed by warning generator 140B, including the nature of a "SUSPICIOUS SITE" threat, a location of the web site, and the type of web site "news & media", and a control to close the connection to the web site, in accordance with an embodiment of the present invention. FIG. 17 shows that the threat is phishing malware that steals personal information, and that the web site is categorized as "news & media" and resolves to a domain located in the United States.

Figure 19:
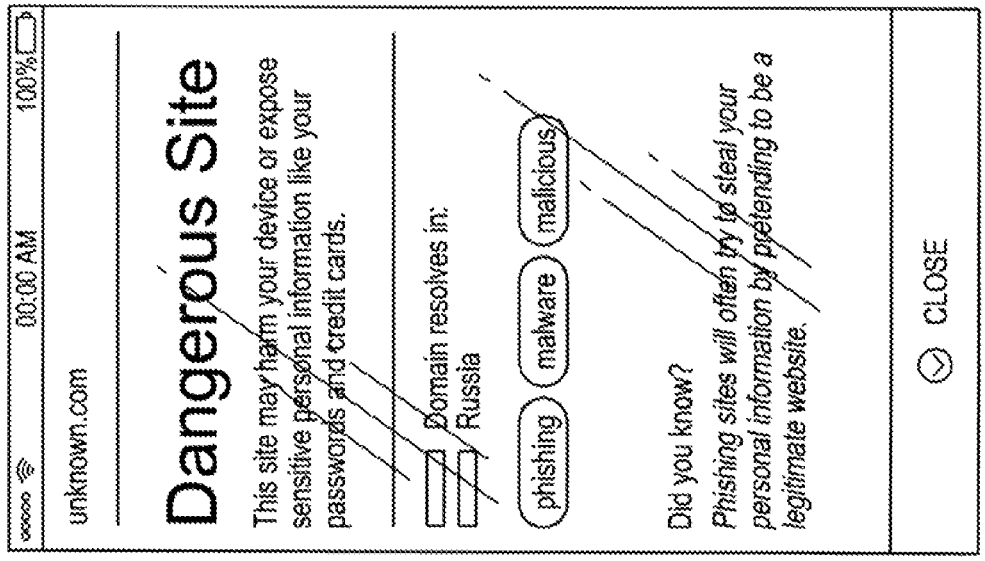
FIG. 19 is a screen shot of a warning including the nature of a "DANGEROUS SITE" threat, a location of the web site, and the type of website "phishing . . . ", and a control to close the connection to the web site, in accordance with an embodiment of the present invention.
Figure 18:
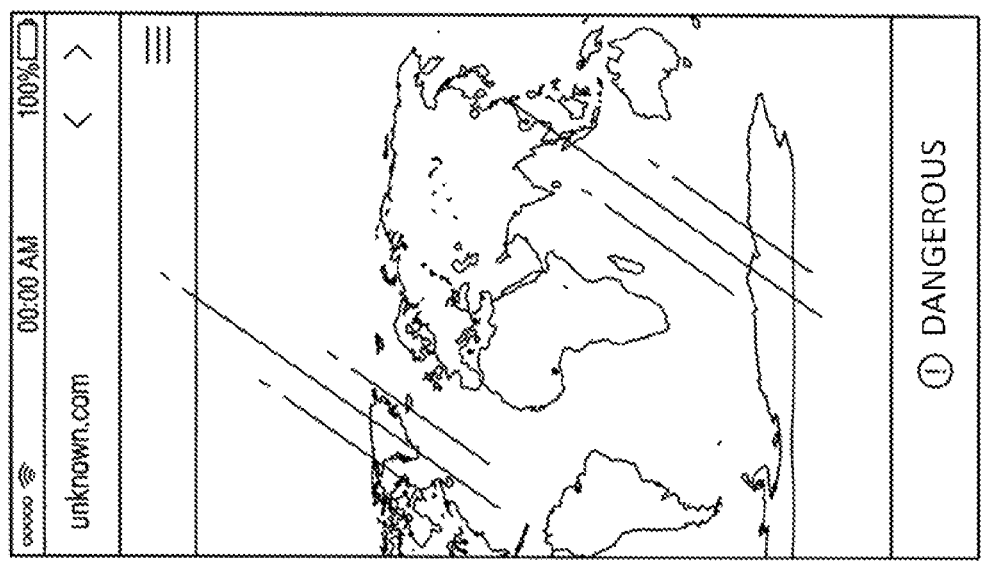
FIG. 18 is a screen shot of a threat level of "DANGEROUS" for a web site, in accordance with an embodiment of the present invention.

Reference is made to FIG. 18, which is a screen shot of a threat level of "DANGEROUS" for the web site "unknown.com", in accordance with an embodiment of the present invention. Reference is made to FIG. 19 which is a screen shot of a warning displayed by warning generator 140B, including the nature of a "DANGEROUS SITE" threat, a location of the web site, and the type of website "phishing . . . ", and a control to close the connection to the web site, in accordance with an embodiment of the present invention. Specifically FIG. 19 shows that the threat is phishing malware that steals personal information, and that the web site is categorized as "phishing", "ma/ware" and "malicious", and resolves to a domain located in Russia.

Figure 20:
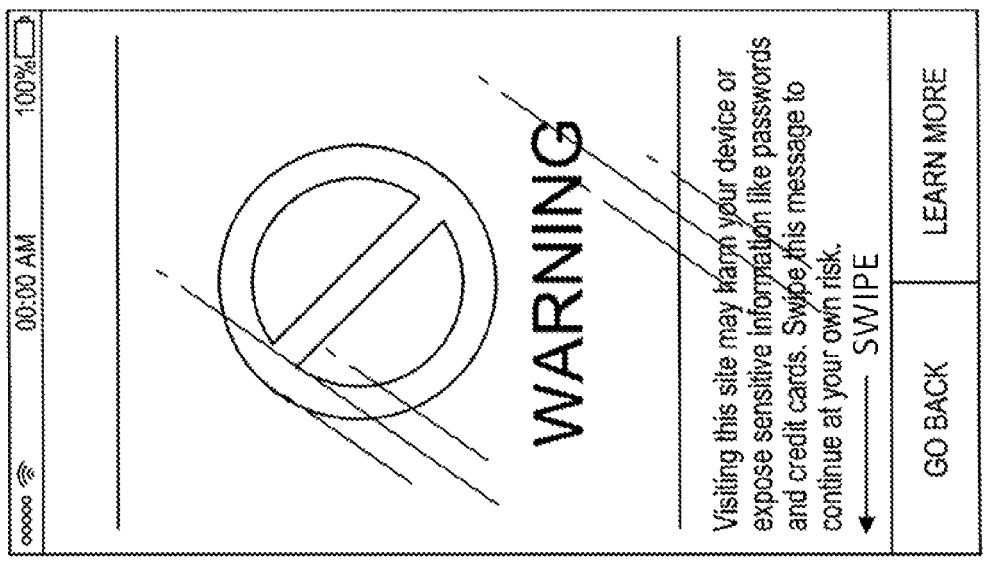
FIG. 20 is a screen shot showing a threat warning for a web site displayed by the web browser of FIG. 9, cautioning the user and requiring a user to perform a swipe gesture in order to access the dangerous web site of FIG. 18, in accordance with an embodiment of the present invention.

At operation 1160 the user requests access to content at the identified web site. If the requested content has a threat level of "DANGEROUS", then at operation 1164, warning generator 140C prompts the user to perform a confirmatory gesture, such as a swipe gesture. Such a prompt is shown in FIG. 20. Operation 1164 is performed only when the threat level of the identified web site is "DANGEROUS"; alternatively, operation 1164 may be performed when the threat level of the identified web site is either "SUSPICIOUS" or "DANGEROUS".

Reference is made to FIG. 20, which is a screen shot showing a threat warning for a web site, displayed by warning generator 140C, cautioning the user and requiring a user to perform a swipe gesture in order to access the dangerous web site of FIG. 18, in accordance with an embodiment of the present invention. FIG. 20 shows a threat warning for the web site "unknown.com" displayed by warning generator 140C, in accordance with an embodiment of the present invention. The warning includes the text "WARNING" displayed with a caution sign, and a message indicating that accessing the identified web site may be harmful to mobile device 100 or may compromise sensitive information of the user. The warning also provides touch controls for the user to "GO BACK" and not access the identified web site, or to "LEARN MORE" about the nature of the threat. If the user wishes nevertheless to access the identified web site, then the user is required to perform a swipe gesture on I/O module 130, to slide the warning message off of the display.

Figure 21:
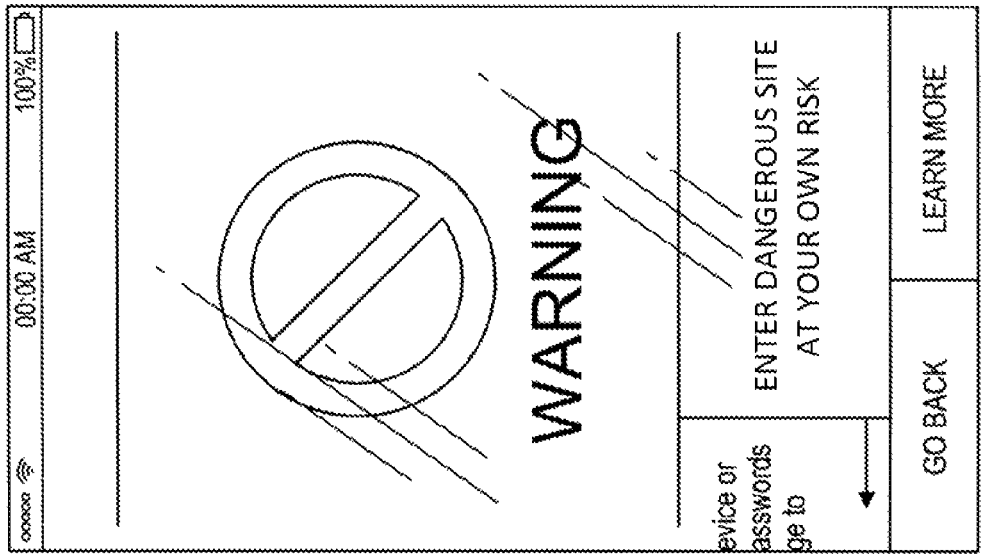
FIG. 21 is a screen shot of a swipe gesture being performed to access the dangerous web site of FIG. 18, in accordance with an embodiment of the present invention.

At operation 1168 the user reviews the displayed message and decides nevertheless to perform the confirmatory gesture. In this regard, reference is made to FIG. 21, which is a screen shot of a swipe gesture being performed on I/O module 130 to access the dangerous web site of FIG. 18, in accordance with an embodiment of the present invention. As the swipe gesture is being performed and the warning message slides out of the display, another message, "VISIT DANGEROUS SITE", slides into the display. As such, it will be appreciated by those skilled in the art that it is highly unlikely that the user access the identified web site unintentionally.

At operation 1172, in response to the user having performed the confirmatory gesture at operation 1168, web browser 120 attempts to access the identified web site. However, it may be that the identified web site redirects web browser 120 using a different identifier than that received at operation 1108. Web browser 120 may register itself to listen to redirection events and, as such, is able to hook the redirection event before it accesses the different identifier. At decision 1176, web browser 120 determines whether or not it has been redirected. If so, processing returns to operation 1108, where web browser 120 passes the different identifier to scan engine(s) 250 for analysis. Otherwise, if decision 1176 determines that web browser 120 has not been redirected, processing advances to operation 1180, where web browser 120 accesses the content that the user requested at operation 1160. The user then views and interacts with the content at operation 1184, thereby completing flowchart 1100.

In an alternative embodiment of the present invention, warning generator 140B of FIG. 9 may be eliminated and, correspondingly, method 1100 of FIG. 10 may advance directly from operation 1148 to operation 1160. As such, the tri-warning module, system and method of FIGS. 9 and 10 may optionally be a bi-warning module, system and method, respectively, without using the intermediate informational warnings, such as the warnings shown in FIGS. 15, 17 and 19. Instead, after displaying the threat level (first warning) of an identified web site at operation 1148, if the threat level is "DANGEROUS" the user is required to perform a confirmatory gesture in order to access the site (second warning) at operation 1168. To indicate this alternative embodiment, warning generator 140B is drawn with a dashed rectangle in FIG. 9, operations 1152 and 1156 are drawn with dashed rectangles in FIG. 10, and an arrow from operation 1148 to operation 1160 is drawn with a dashed line in FIG. 10.

There are many ways to classify malware threats based on scan results from scan engine(s) 250. Inter alia classification of malware threats by warning generator 140A into types "SAFE", "SUSPICIOUS" and "DANGEROUS" may be based on statistics of the virus scan results provided to warning generator 140A from scan engine(s) 250. In one exemplary embodiment, categorization may be based on statistical conditions such as those shown in TABLE I below.

TABLE I

Statistical breakdown of scan engine results into threat levels

| Threat Type | Condition |
| --- | --- |
| SAFE | <5% of the scan engines indicate risk |
| SUSPICIOUS | 5%-75% of the scan engines indicate risk |
| DANGEROUS | >75% of the scan engines indicate risk |

In another exemplary embodiment, the scan engine(s) 250 may provide their own results that can be mapped to the "SAFE", "SUSPICIOUS" and "DANGEROUS" trichotomy, and categorization may be based on statistical conditions such as those shown in TABLE II below.

TABLE II

Statistical breakdown of scan engine results into threat levels

| Threat Type | Condition |
| --- | --- |
| SAFE | At most 1 of the scan engine results map to DANGEROUS or SUSPICIOUS. |
| SUSPICIOUS | at least 2 of the scan engine results map to SUSPICIOUS. |
| DANGEROUS | at least 2 of the scan engine results map to DANGEROUS, or 1 scan engine result maps to DANGEROUS and 1 scan engine result maps to SUSPICIOUS. |

Those skilled in the art will appreciate that TABLES I and II are merely exemplary. The present invention anticipates other classifications based on scan results from scan engine(s) 250.

Figure 14:
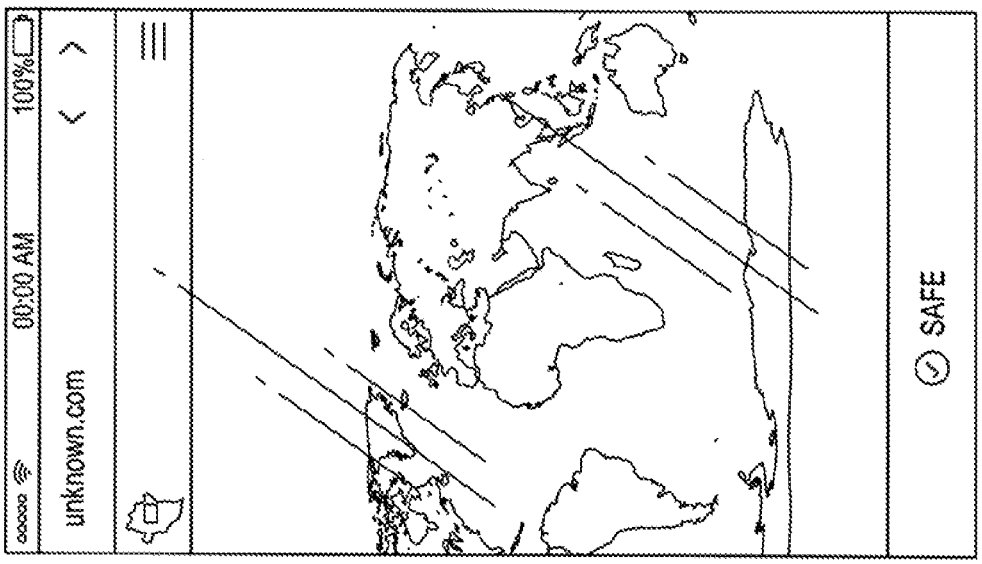
FIG. 14 is a screen shot of a threat level of "SAFE" for a web site, in accordance with an embodiment of the present invention.
Figure 22:
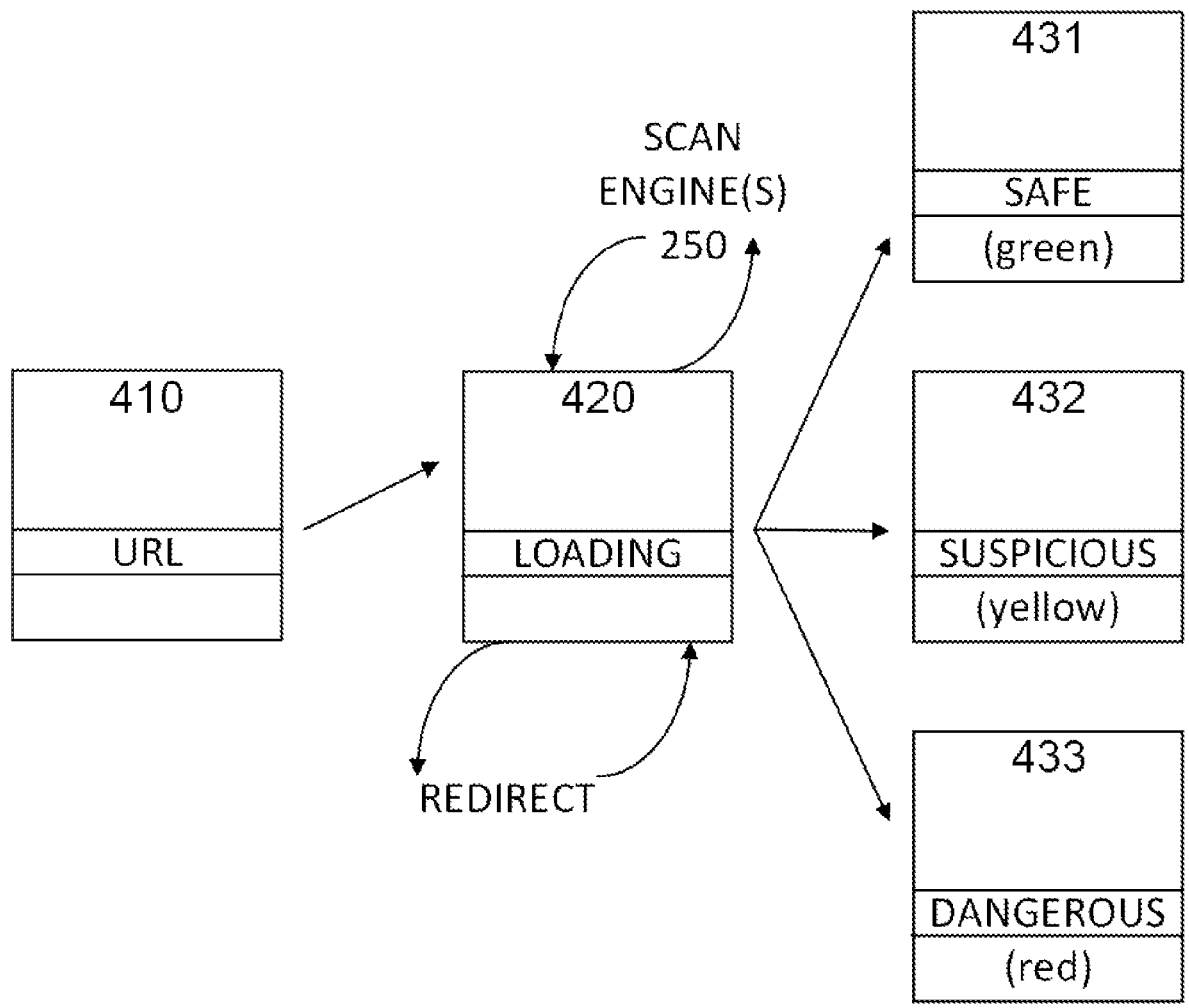
FIG. 22 is a simplified flow diagram using display screens to illustrate stages of a client-based malware warning mechanism, in accordance with an embodiment of the present invention.

Reference is made to FIG. 22, which is a simplified flow diagram using display screens to illustrate stages of a client-based malware warning mechanism, in accordance with an embodiment of the present invention. FIG. 22 includes virus scan engine(s) 250. Screen 410 is a landing screen, e.g., the screen shown in FIG. 11, prompting a user to enter a URL. Screen 420 is a loading screen, e.g., the screen shown in FIG. 12. While screen 420 is being displayed, warning generator 140A determines the security threat of the URL that was entered in screen 410. If security information for the URL is not readily available in URL database 150, then client device 100 queries scan engine(s) 250 for information about the URL. After determining the security threat, warning generator 140A displays either a "SAFE" screen 431, e.g., the screen shown in FIG. 14, or a "SUSPICIOUS" screen 432, e.g., the screen shown in FIG. 16, or a "DANGEROUS" screen 433, e.g., the screen shown in FIG. 18.

Web browser 120 then performs the warning method of FIG. 10 beginning at operation 1152. Upon request by the user of information about the nature of the threat, warning generator 140B generates warning screens, such as the screens shown in FIGS. 15, 17 and 19, with warning information for the respective "SAFE", "SUSPICIOUS" and "DANGEROUS" threat levels.

If the user decides to access the content at the URL, then warning generator 140C requires that the user perform a confirmatory gesture, as shown in FIG. 20. Upon performing the confirmatory gesture, web browser 120 attempts to access the URL. If web browser is re-directed to another URL, then web browser 120 hooks the re-direction event and displays screen 420, prior to web browser 120 accessing the other URL.

Middleware Server-Based Embodiment

Figure 23:
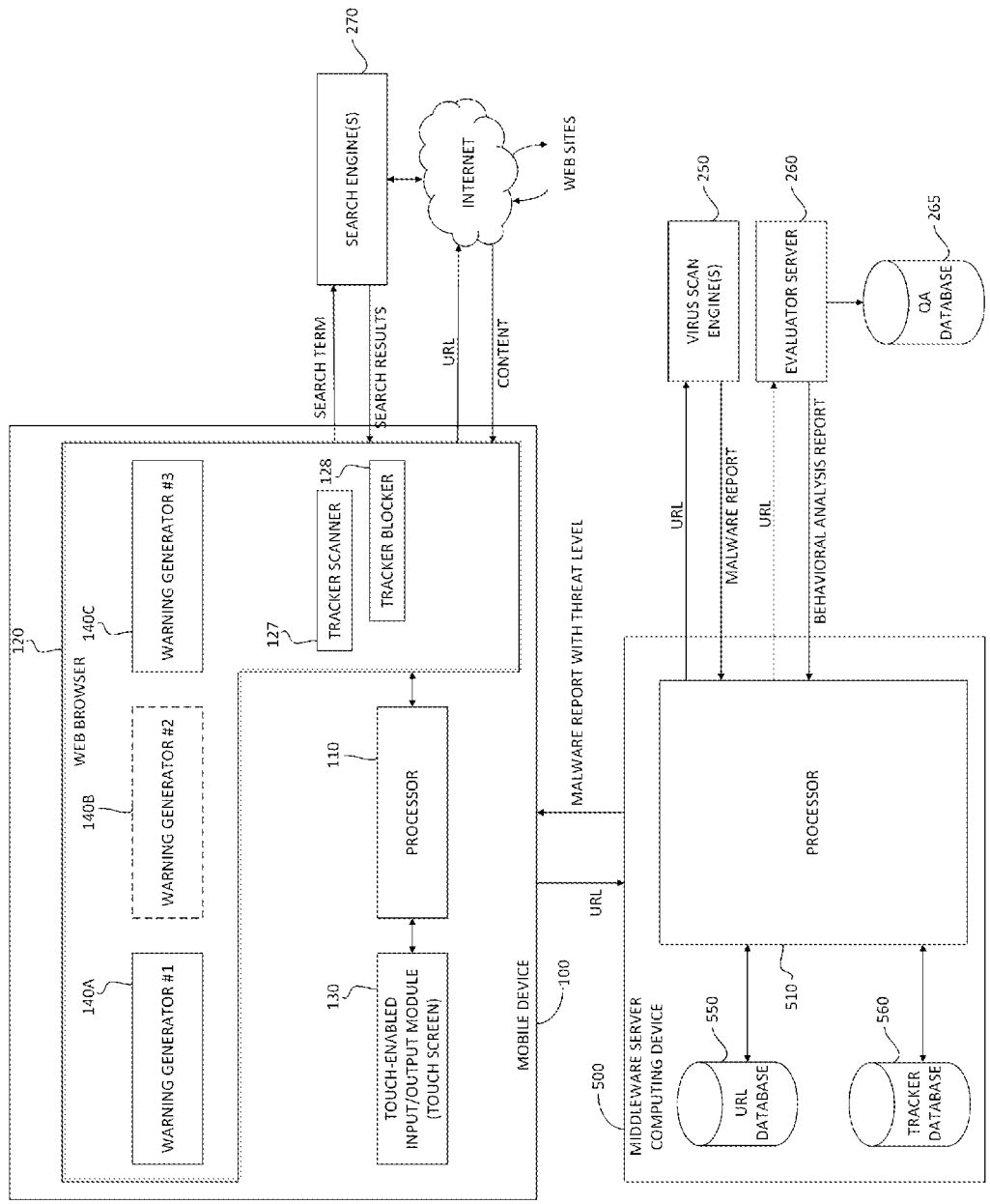
FIG. 23 is a simplified diagram of a middleware server-based embodiment of a malware warning system for URLs, in accordance with an embodiment of the present invention.

Reference is made to FIG. 23, which is a simplified diagram of a middleware server-based embodiment of a malware warning system for URLs, in accordance with an embodiment of the present invention. As shown in FIG. 23 middleware server 500 intermediates between web browser 120 and scan engine(s) 250.

In an embodiment of the present invention, web browser 120 interacts with middleware server 500, transmitting URLs to middleware server 500 and receiving malware reports from middleware server 500.

It will be appreciated by those skilled in the art that a client-server architecture affords many variations in distribution of processing labor between the client and the server, all of which are contemplated by the present invention. Thus, comparing FIG. 23 to FIG. 9, in FIG. 23 middleware server 500, instead of web browser 120, passes URLs to scan engine(s) 250 and to evaluator server 260. In alternative embodiments, however, middleware server 500, instead of web browser 120, may pass URLs to the Internet, and/or may pass search terms to search engine 270. Similarly, counterparts of one or more of the three warning generators 140A, 140B and 140C may be components of middleware server 500 instead of or in addition to web browser 120.

Middleware server 500 contains a URL database 550, which stores URLs and their scan results. URL database 550 may reside locally on middleware server 500, as shown in FIG. 23, or alternatively it may reside remote from middleware server 500.

Web browser 120 includes tracker scanner 127 that detects web page trackers, and tracker blocker 128 that blocks web page trackers, and middleware server 500 includes a tracker database 560 that stores known trackers. Operation of tracker scanner 127 and tracker blocker 128, and use of tracker database 560 is described below with reference to FIGS. 35-41.

Figure 24:
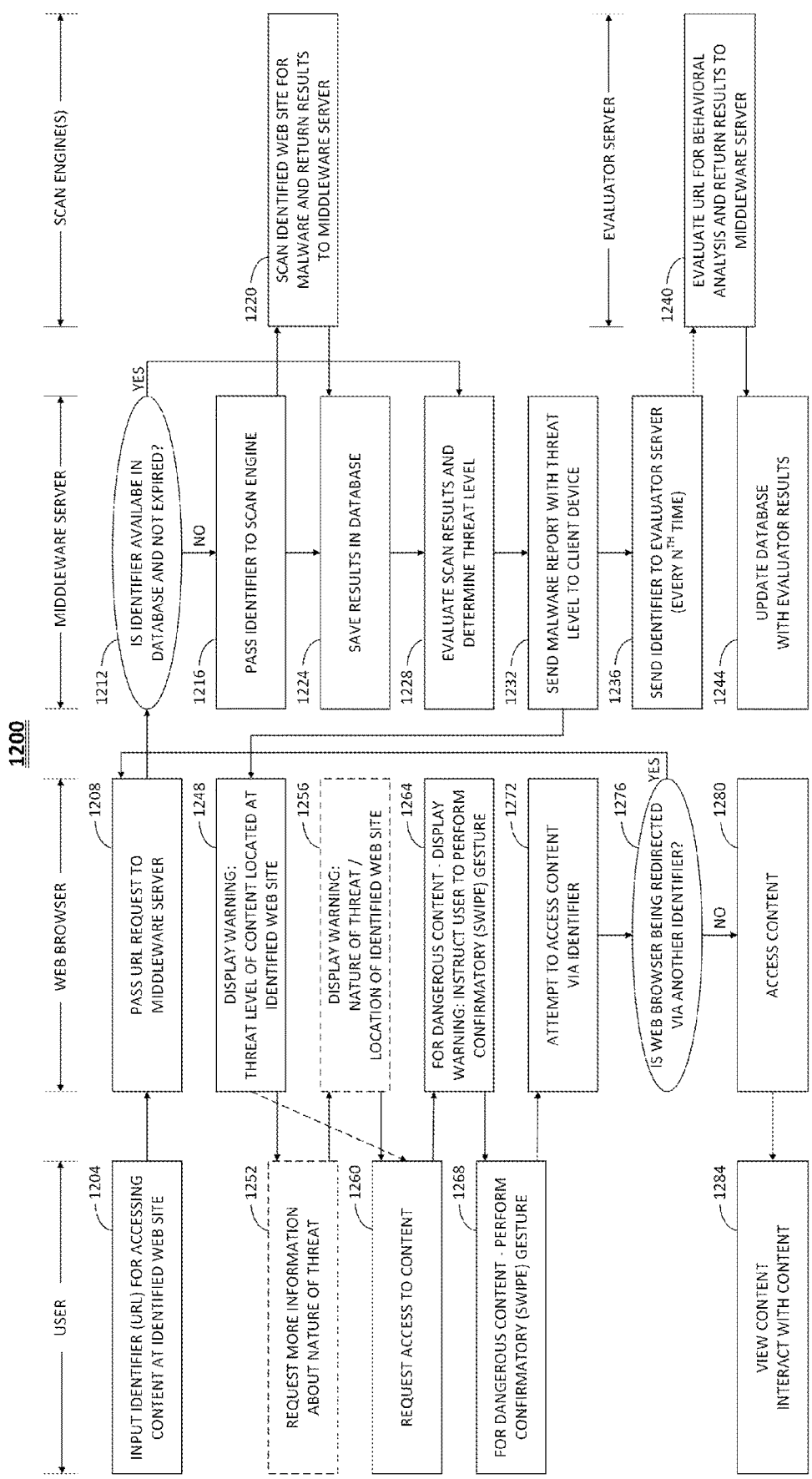
FIG. 24 is a simplified flowchart of a middleware server-based method for malware warning for URLs, in accordance with an embodiment of the present invention.

Reference is made to FIG. 24, which is a simplified flowchart 1200 of a middleware server-based method for malware warning for URLs, in accordance with an embodiment of the present invention. Flowchart 1200 is divided into four columns. The leftmost column includes operations performed by a user of mobile device 100, the second-from-leftmost column includes operations performed by web browser 120, the second-from rightmost column indicates operations performed by middleware server 500, and the rightmost column, at the top, includes operations performed by scan engine(s) 250 and, at the bottom, includes operations performed by evaluator server 260.

At operation 1204, the user enters an identifier, such as a URL, for accessing content at a web site identified by the identifier. At operation 1208, web browser 120 passes the identifier to middleware server 500 for analysis, thereby relieving web browser 120 from this task. At decision 1212, middleware server 500 consults URL database 550 to determine if information about the URL already resides in URL database 550, and if this information has not expired. An expiration date, e.g., 30 days, is pre-configured, so as to force re-scans of URLs after a time period. If decision 1212 is affirmative, then flowchart 1200 advances to operation 1228. Otherwise, if decision 1212 is negative, then at operation 1216 middleware server 500 passes the identifier to scan engine(s) 250 for analysis.

At operation 1220, scan engine(s) 250 scan the identified content for potential malware, and return scan results to middleware server 500. At operation 1224, middleware server 500 saves the scan results in URL database 550. At operation 1228, middleware server 500 evaluates the scan results that it received from scan engine(s) 250, and determines a threat level of the identified content. E.g., in one embodiment of the present invention, there are three threat levels; namely, "SAFE", "SUSPICIOUS" or "DANGEROUS". Determination of threat level may be based on statistics of the scan results, as described hereinabove with reference to TABLES I and II. At operation 1232, middleware server 500 passes a malware report including the threat level to web browser 120.

At operation 1236, middleware server 500 sends the identifier to evaluator server 260 at each $N^{th}$ pass through operation 1236; e.g., at each 4$^{th}$ pass. Operation of evaluator server 260 is described below with reference to FIG. 30. At operation 1240 evaluator server 260 performs a behavioral analysis for the content identified by the URL, and returns its results to middleware server 500. At operation 1244, middleware server 500 updates the URL database 550 with the results it receives from evaluator server 260.

Subsequent operations 1248-1284 are similar to correspondingly numbered operations 1148-1184, which are described above with reference to FIG. 10.

Figure 25:
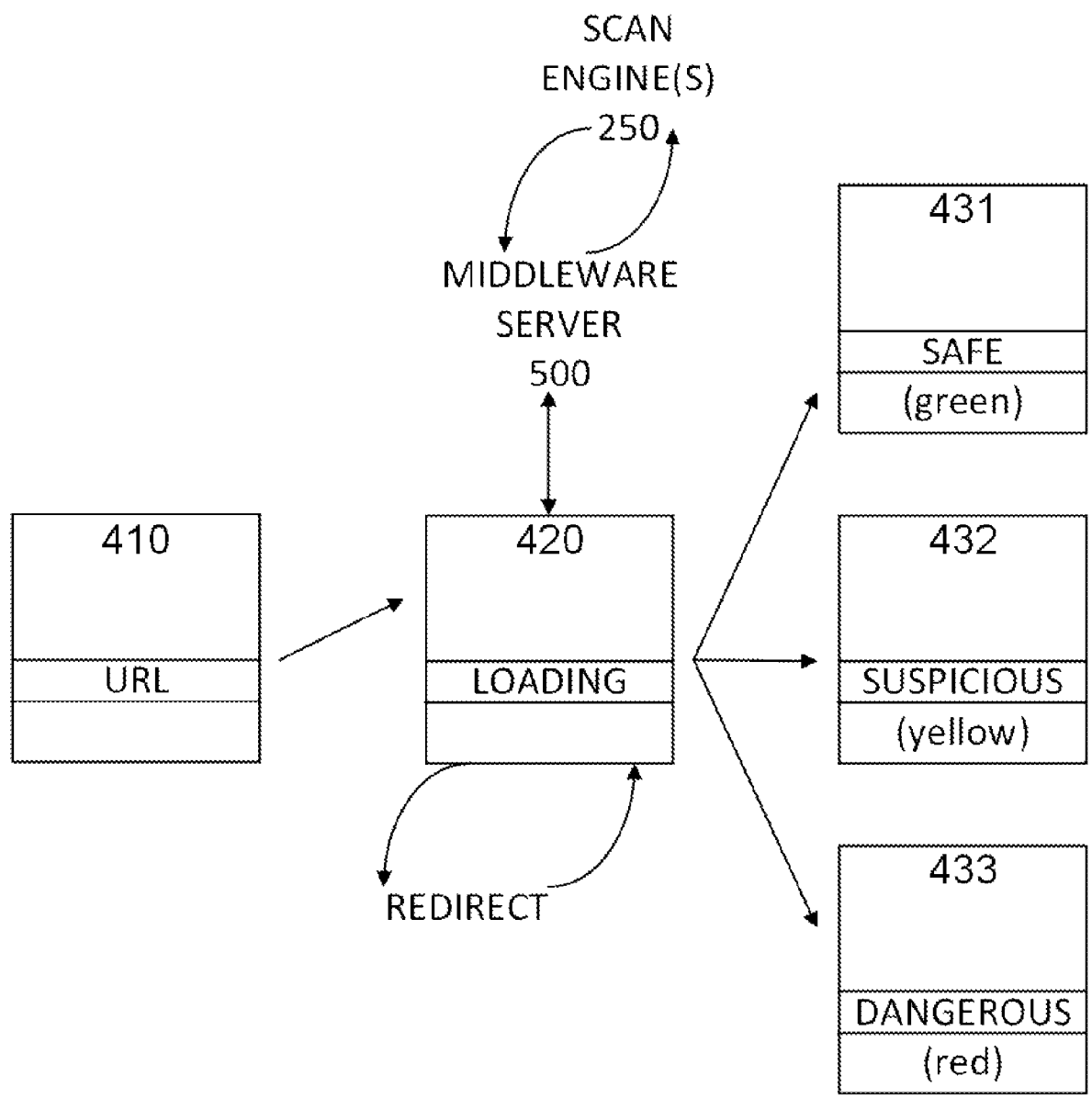
FIG. 25 is a simplified flow diagram using display screens to illustrate stages of a middleware server-based malware warning mechanism, in accordance with an embodiment of the present invention.

Reference is made to FIG. 25, which is a simplified flow diagram using display screens to illustrate stages of a middleware server-based malware warning mechanism, in accordance with an embodiment of the present invention. FIG. 25 includes middleware server 500 and scan engine(s) 250. Screen 410 is a landing screen, e.g., the screen shown in FIG. 11, prompting a user to enter a URL. Screen 420 is a loading screen, e.g., the screen shown in FIG. 12. While screen 420 is being displayed, web browser 120 sends the URL that was entered in screen 410 to middleware server 500 for analysis. If security information for the URL is not readily available to middleware server 500 in URL database 550, or if the information is available but out-of-date, then middleware server 500 queries scan engine(s) 250 for information about the URL. After web browser 120 receives a threat level for the URL from middleware server 500, warning generator 140A displays either a "SAFE" screen 431, e.g., the screen shown in FIG. 14, or a "SUSPICIOUS" screen 432, e.g., the screen shown in FIG. 16, or a "DANGEROUS" screen 433, e.g., the screen shown in FIG. 18, based on the threat level of the identified content.

Web browser 120 then performs the warning method of FIG. 24 beginning at operation 1252. Optionally, upon request by the user of information about the nature of the threat, warning generator 140B generates warning information, such as the information shown in FIGS. 15, 17 and 19 for the respective "SAFE", "SUSPICIOUS" and "DANGEROUS" threat levels.

If the user decides to access the content at the URL, and if that content has a threat level of "DANGEROUS", then warning generator 140C requires that the user perform a confirmatory gesture. Upon performing the confirmatory gesture, web browser 120 attempts to access the URL. If web browser 120 is re-directed to another URL, then web browser 120 hooks the re-direction event, and reports the re-direction event to middleware server 500, which then analyzes the other URL.

Figure 26:
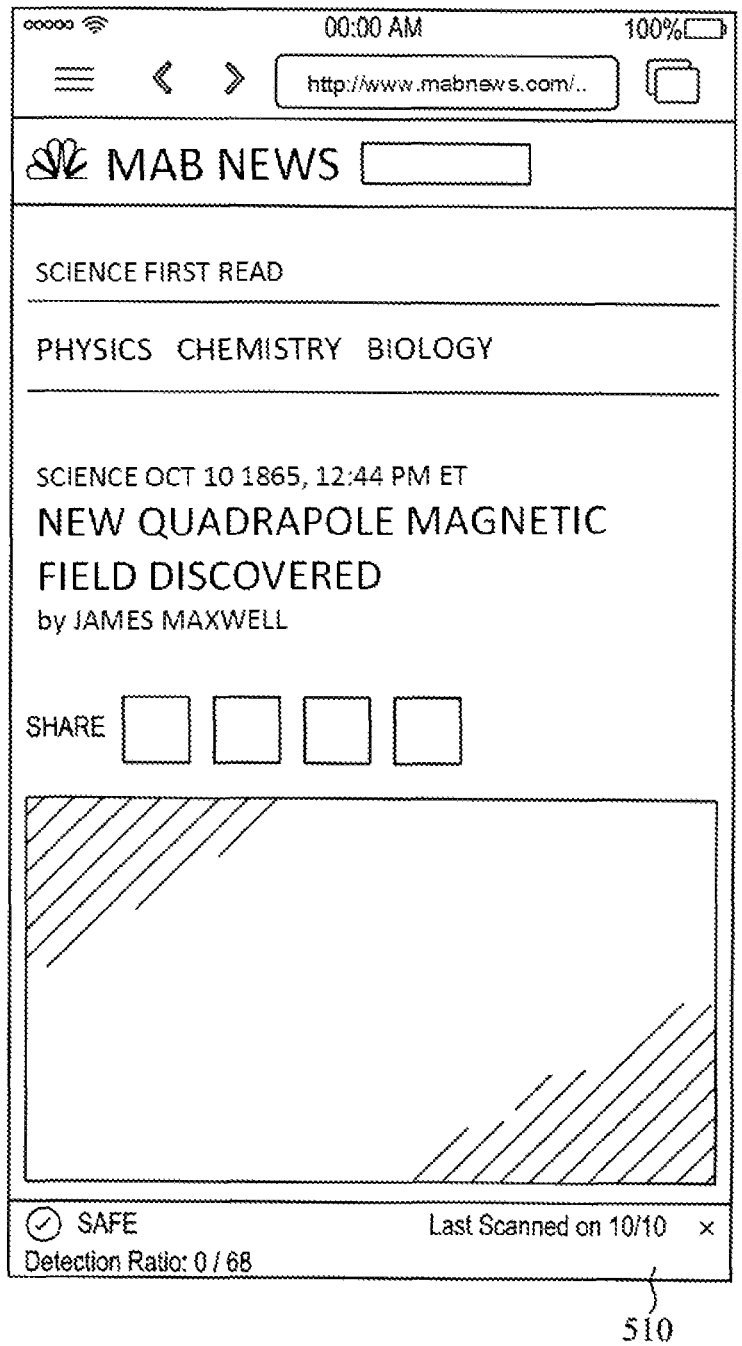
FIG. 26 is a screen shot of a "SAFE" web page with a scan results alert bar providing security evaluation information, displayed at the bottom of the page, in accordance with an embodiment of the present invention.

Reference is made to FIG. 26, which is a screen shot of a "SAFE" web page with a scan results alert bar 360 providing security evaluation information, displayed at the bottom of the page, in accordance with an embodiment of the present invention. When a page is loaded, scan results alert bar 360 is displayed and remains displayed for a pre-configured amount of time. In accordance with an embodiment of the present invention, by pressing on results alert bar 360 the user is able to request display of the complete scan results for the URL.

Figure 27:
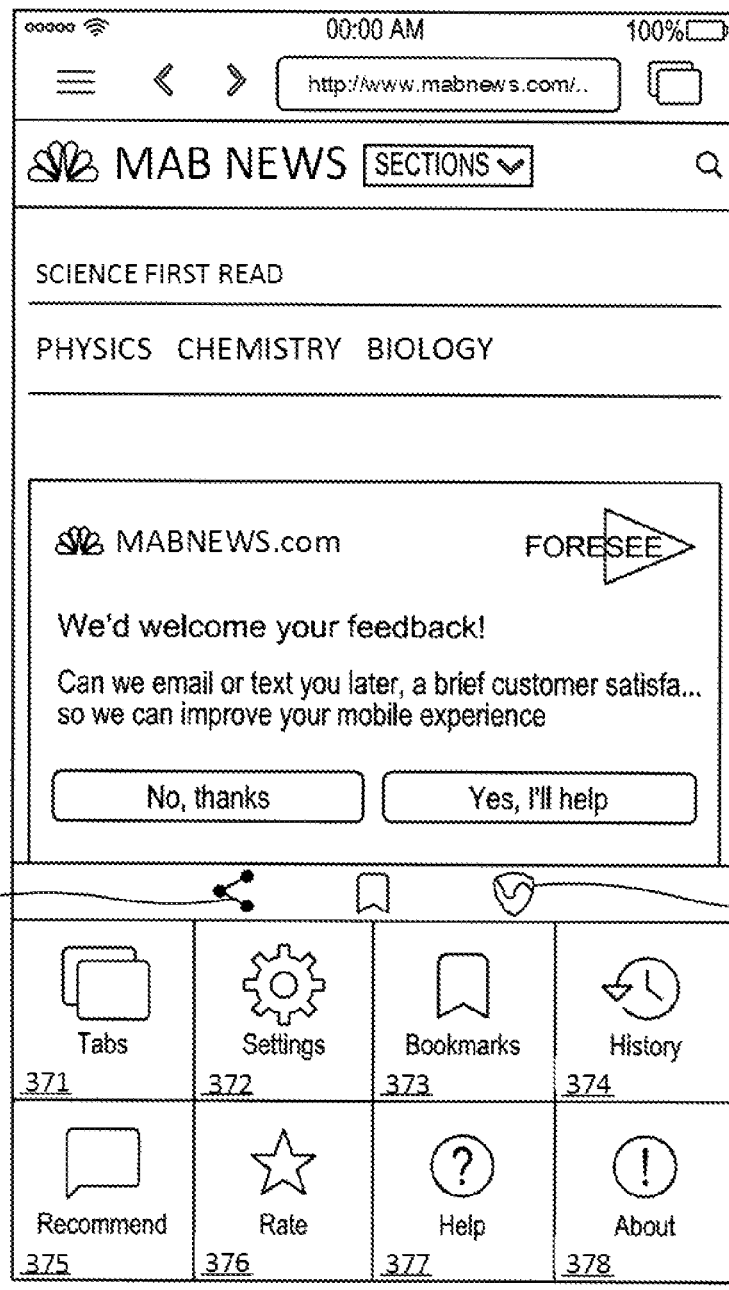
FIG. 27 is a screen shot of a web page with interactive browser controls displayed below, in accordance with an embodiment of the present invention.

Reference is made to FIG. 27, which is a screen shot of a web page with interactive browser controls displayed below, in accordance with an embodiment of the present invention. FIG. 27 shows a control 371 for tabbing through web pages, a control 372 for configuring settings, a control 373 for bookmarking a currently active web page and opening a bookmarked page, a control 374 for viewing and accessing a browsing history, a control 375 for recommending a currently active web page, a control 376 for rating a currently active web page, a control 377 for help, a control 378 for information about web browser 120, and a control 379 for sending the currently active web page. FIG. 27 also shows control 330 for forcing an immediate scan of a currently active URL page.

Figure 28:
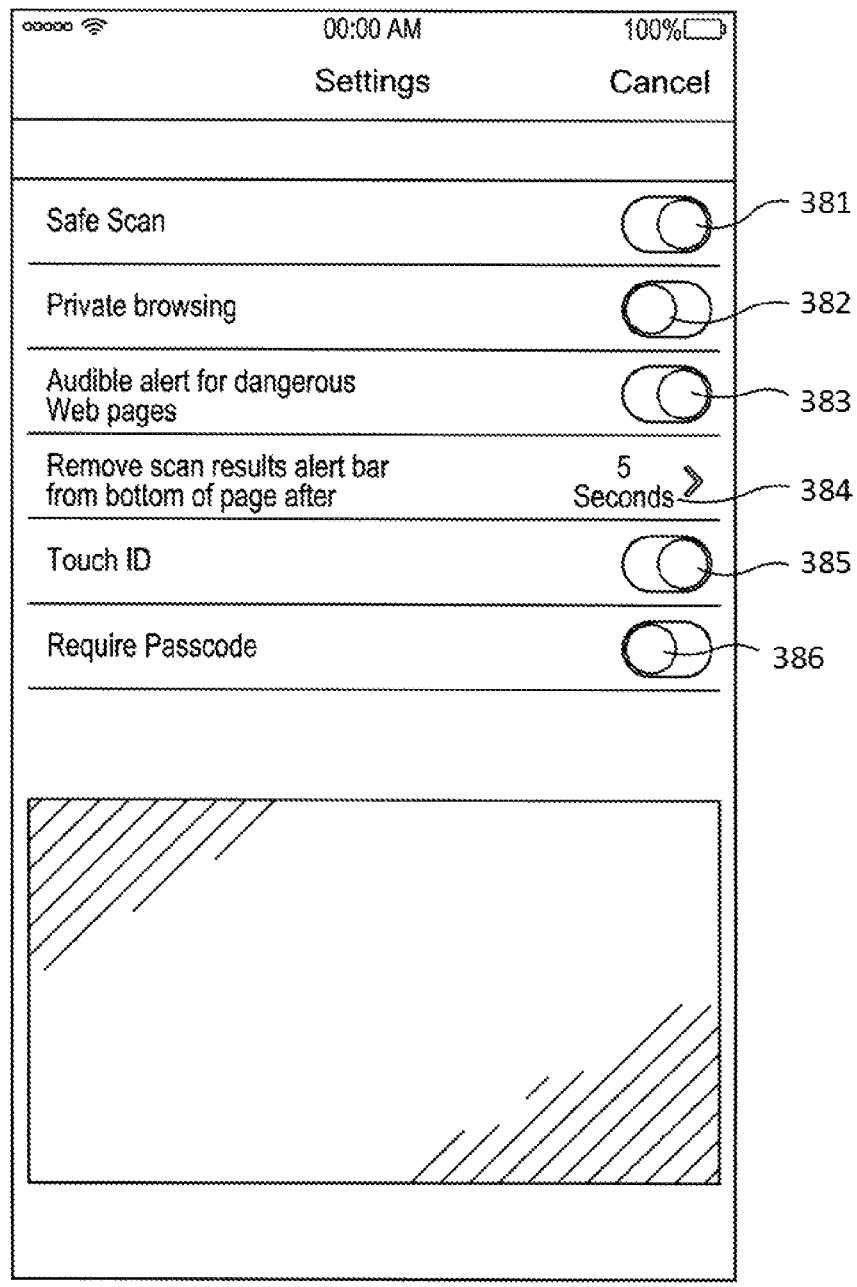
FIG. 28 is a screen shot of configuring security settings for the web browser of FIG. 23, in accordance with an embodiment of the present invention.

Reference is made to FIG. 28, which is a screen shot of configuring security settings web browser 120, in accordance with an embodiment of the present invention. FIG. 28 shows a setting 381 for turning the URL scanning on and off. FIG. 28 also shows a setting 382 for turning on and off private browsing; i.e., browsing without storing a history log. When private browsing is turned on, and a user attempts to set a bookmark, the user is asked to confirm that he wishes to set the bookmark since it will leave a history of a web site that he visited.

FIG. 28 also shows a setting 383 for turning on and off an audible alert for dangerous web pages. FIG. 28 also shows a control 384 for configuring an amount of time that scan results alert bar 360 (FIG. 26) remains displayed. FIG. 28 also shows a setting 385 for turning touch identification on and off. FIG. 28 also shows a setting 386 for turning passcode protection on and off.

URL Behavioral Analysis

Figure 29:
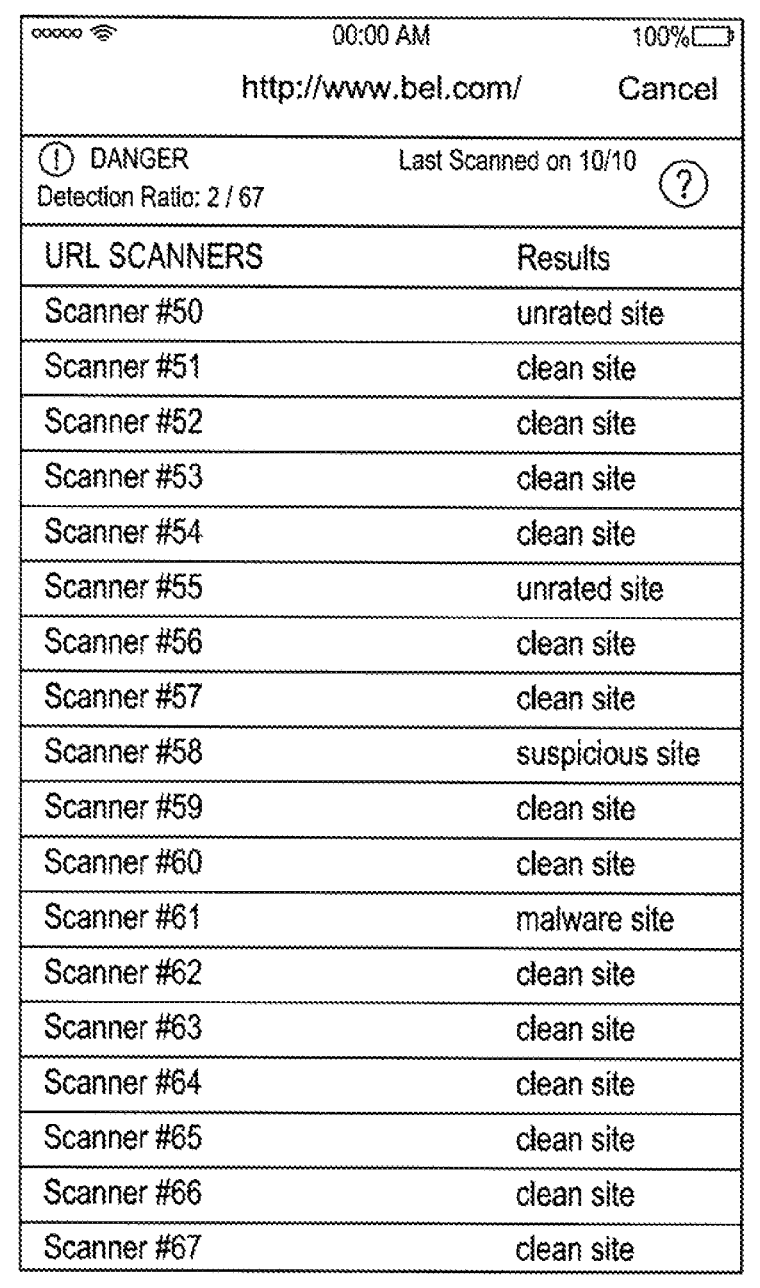

Scan engine(s) 250 may provide only pass/fail information, or grade/rating information indicating a level of risk for URL content. Reference is made to FIG. 29, which is a screen shot of aggregate scan results from a plurality of different scanners, in accordance with an embodiment of the present invention.

In distinction, evaluator server 260 performs script behavioral analysis and provides security profile data including a list of suspicious operations performed by URL content. However, such analysis is more time-consuming that the scans performed by scan engine(s) 250, and it is generally unfeasible for web browser 120 to perform such analysis in-line, since the longer response time for loading and displaying URL content to a user would overburden and frustrate the user.

Instead, embodiments of the present invention provide behavioral analysis off-line, non-synchronous with scan engine(s) 250, so as not to interfere with the user's browsing experience. The results of the behavioral analysis are stored in QA database 265, and provided to the user or to an administrator automatically, or upon request.

Figure 30:
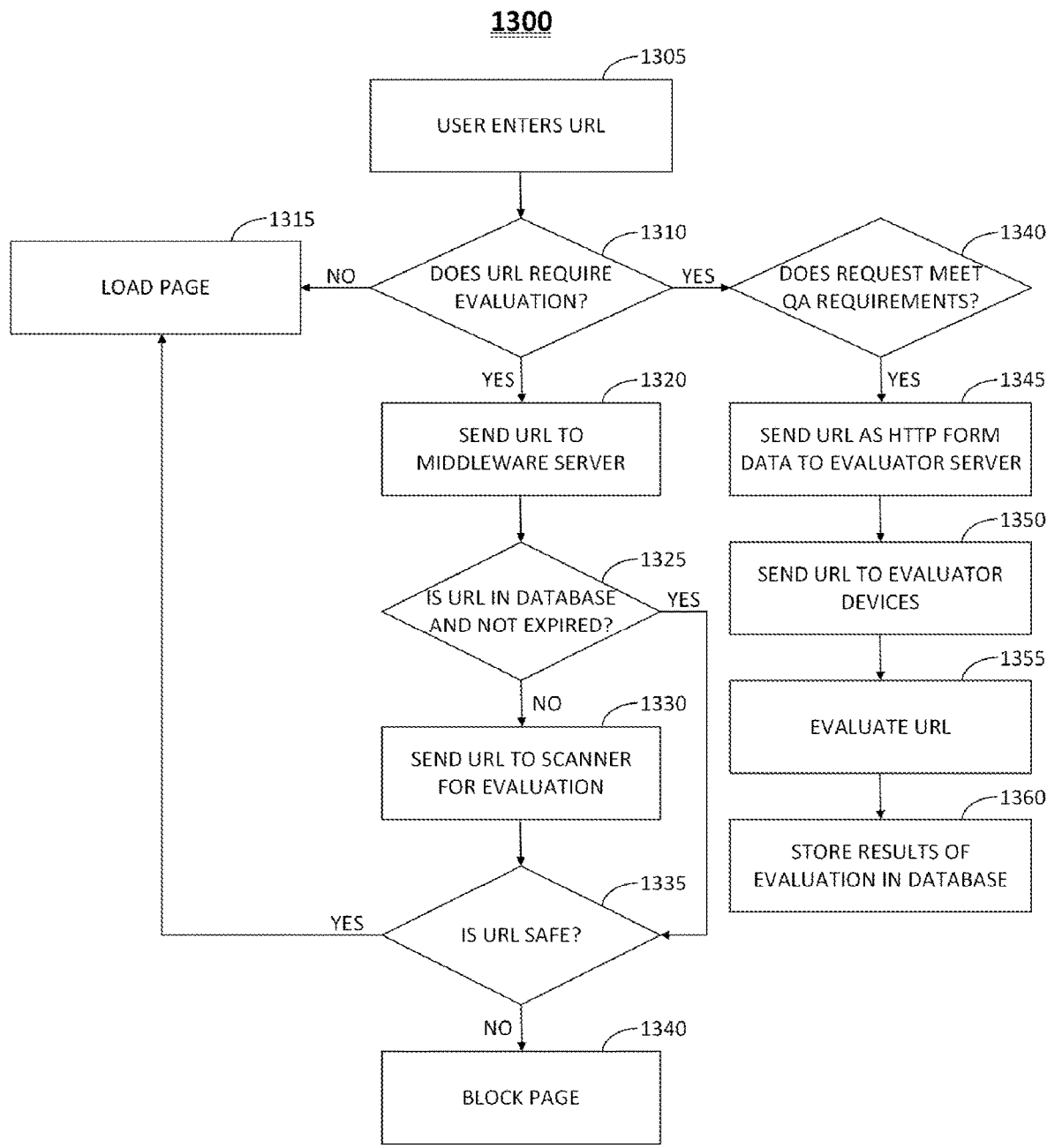
FIG. 30 is a simplified flowchart of a URL evaluation method, in accordance with an embodiment of the present invention.

Reference is made to FIG. 30, which is a simplified flowchart 1300 of a URL evaluation method, in accordance with an embodiment of the present invention. At operation 1305, a user enters a URL as input to web browser 120. Alternatively, web browser 120 may receive a URL from search engine(s) 270 in response to one or more search terms entered by the user. At decision 1310, a determination is made whether the URL requires evaluation. Inter alia the determination at operation 1310 may be made by checking if the URL is listed in a "black list" of potentially malicious URLs, in which case the URL is deemed to require evaluation. Alternatively, the determination at operation 1310 may be made by checking if the URL is listed in a "white list" of trusted URLs, in which case the URL is deemed to not require evaluation. Yet alternatively, a URL may be deemed to not require evaluation if the URL is in a browsing history, and has been there for the past N days, where N is a pre-configured number.

If it is determined at decision 1310 that the URL does not require evaluation, then at operation 1315 the content linked to by the URL is loaded into web browser 120. Otherwise, if it is determined at operation 1310 that the URL does require evaluation, then at operation 1320 the URL is sent to a middleware server such as middleware server 500.

At decision 1325 the middleware server determines if the URL resides in URL database 550, which stores URLs and their scan results, and if the URL information has not expired. If it is determined at decision 1325 that the URL does not reside in URL database 550 or that the URL does reside in URL database 550 but its information has expired, then at operation 1330 the URL is sent to scan engine(s) 250 for security evaluation. At decision 1335 a determination is made whether or not the URL content is safe. If it is determined at operation 1335 that the URL content is safe, then control proceeds to operation 1315 where the URL content is loaded into web browser 120. Otherwise, if it is determined at decision 1335 that the URL content is not safe, then the URL is blocked at operation 1340.

If it is determined at operation 1325 that the URL does reside in URL database 550 and its information has not expired, then control proceeds directly from operation 1325 to operation 1335, bypassing the scan at operation 1330. It will be appreciated by those skilled in the art that bypassing the scan eliminates time-consuming processing, and accelerates method 1300. It will be further appreciated by those skilled in the art that URL database 550 may be configured to delete old URLs that have not been recently scanned, e.g., URLs that have not been scanned within the past 30 days, in order to cause flowchart 1300 to re-scan such URLs.

Returning to operation 1310, if it is determined at operation 1310 that the URL does require evaluation, then at operation 1340 a determination is made whether one or more quality assurance (QA) sample check criteria are met. E.g., every $4^{th}$ URL may be selected for QA testing; alternatively, selection may be random. If it is determined at operation 1340 that the one or more QA criteria are met, then at operation 1345 the URL is sent to evaluator server 260, e.g., as HTTP form data, for performance of behavioral analysis on the URL page.

At operation 1350 the evaluator server sends the URL to one or more evaluator devices. At operation 1355 the one or more evaluator devices evaluate behavior of the URL content, e.g., by deriving a list of suspicious operations performed by the URL content. At operation 1360 the results of the evaluation are stored in URL database 550. Optionally, the results of the evaluation may be stored in QA database 265, for access by an administrator. Operations 1340-1360 ensure that the behavior analysis by evaluator server 260 is performed separate from the scanning for risk assessment at operation 1330, thus avoiding any degradation of the user's web browsing experience.

Malware Warnings for Search Results

It will be appreciated by those skilled in the art that the warning modules, systems and methods of the present invention are of widespread advantage to many client-server applications. In some embodiments, the present invention is applied to search engines, to provide warning modules, systems and methods for potential malware in web search results. These applications may be embodied inter alia with or without use of a middleware server computer.

Figure 31:
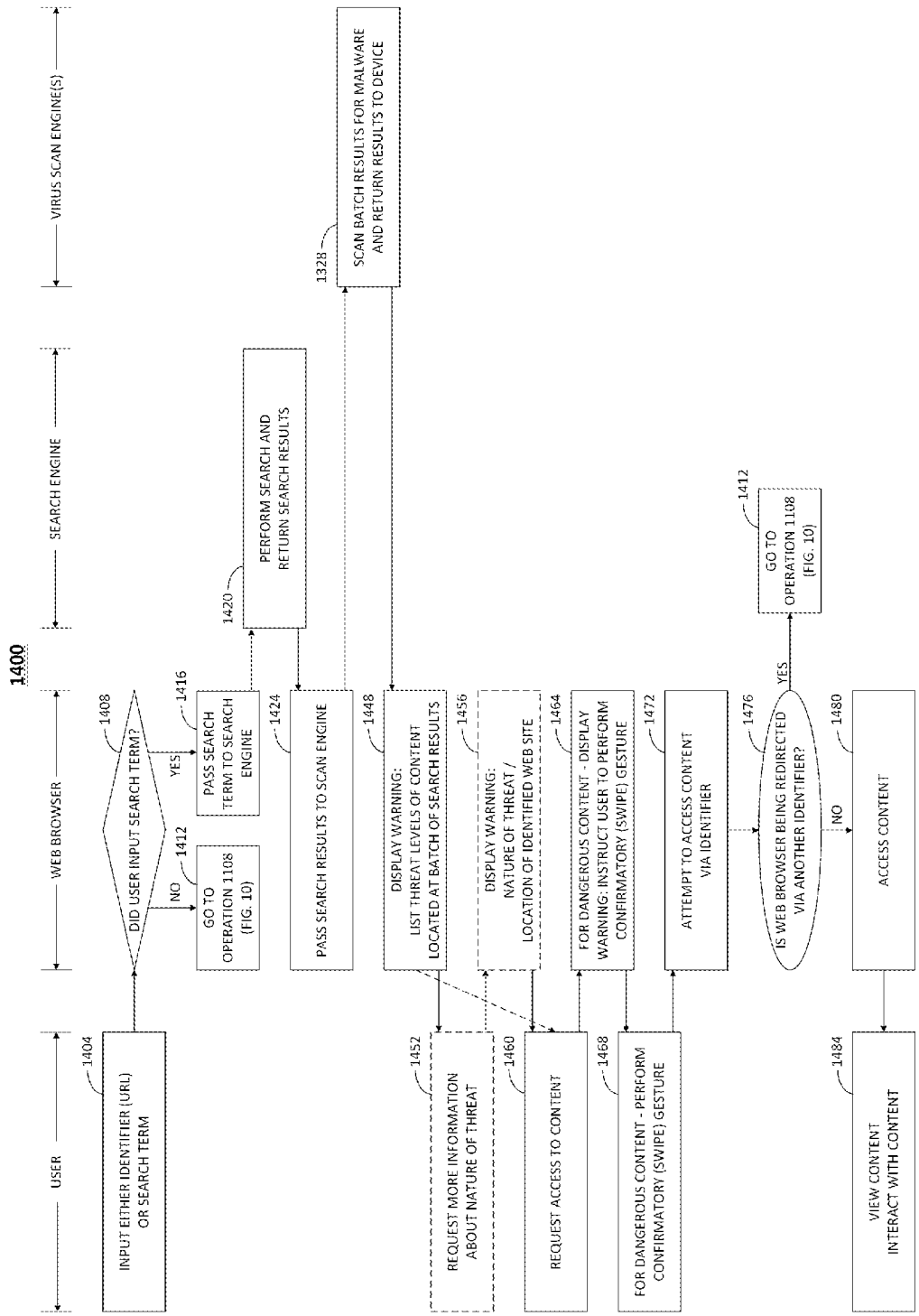
FIG. 31 is a simplified flowchart of a client-based method for malware warning for search results, in accordance with an embodiment of the present invention.

Reference is made to FIG. 31, which is a simplified flowchart 1400 of a client-based method for malware warning for search results, in accordance with an embodiment of the present invention. Flowchart 1400 is divided into four columns. The leftmost column includes operations performed by a user, the second-from-leftmost column includes operations performed by web browser 120, the second-from rightmost column indicates operations performed by search engine(s) 270, and the rightmost column includes operations performed by scan engine(s) 250.

At operation 1404, the user enters either an identifier, such as a URL, or a search term. At decision 1408, web browser 120 determines whether or not the user entered a search term. For example, web browser 120 may examine the text string input by the user for the presence of a domain name extension such as ".com". If decision 1408 determines that the user did not enter a search term, then the user input is an identifier, and at operation 1412 flowchart 1400 advances to operation 1108 of FIG. 10; namely, a method for malware warning for identifiers.

If decision 1408 determines that the user entered a search term, then at operation 1416 web browser 120 passes the search term to search engine(s) 270. At operation 1420 search engine(s) 270 perform the requested search and return their search results to web browser 120. At operation 1424 we browser 120 in turn passes a batch of the search results to scan engine(s) 250, for inspection of each result for potential malware. Search results are sent to scan engine(s) 250 in batches, since there may be a large number of results, and it is not necessary for web browser 120 to wait for scan engine(s) 250 to scan all of the results before presenting some of the results to the user. Each batch may be inter alia a display page worth of results. At operation 1428 scan engine(s) 250 analyze the batch of search results and return their results to web browser 120.

Figure 32:
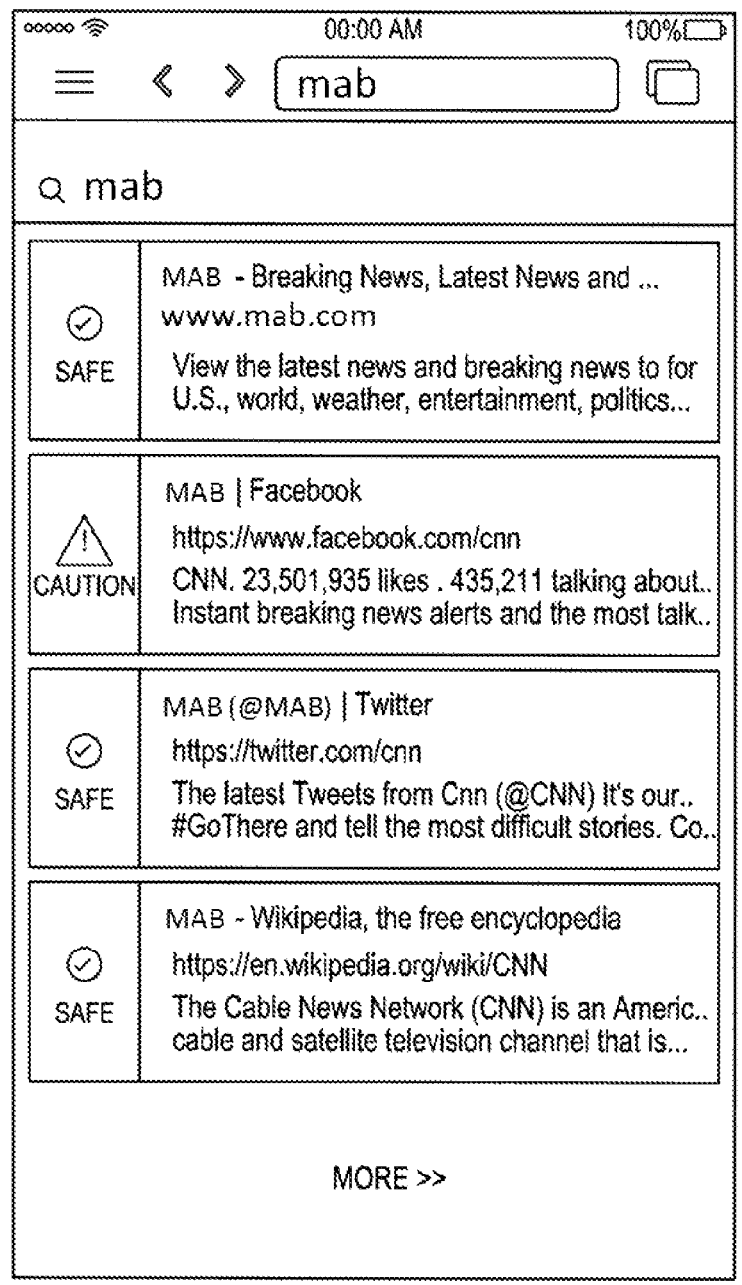
FIG. 32 is a screen shot of a warning regarding potential risks of search results in accordance with an embodiment of the present invention.

At operation 1448, warning generator 140A determines the threat levels of the search result content, e.g., "SAFE", "SUSPICIOUS" or "DANGEROUS"; and displays a list of the search results in the batch together with the threat levels of content located at each result. Reference is made to FIG. 32, which is a screen shot of a warning regarding potential risks of search results in accordance with an embodiment of the present invention.

At operation 1452, the user optionally requests more information about the nature of the threat for one or more of the search results in the list; e.g., the result marked "CAUTION" in FIG. 32. At operation 1456, warning generator 140B displays information about the nature of the threat and/or the location of the one or more search results.

At operation 1460, after having seen the information displayed by warning generator 140B, the user requests access to one of the search results. At operation 1464, warning generator 140C displays a warning instructing the user to perform a confirmatory gesture, such as a swipe gesture, to confirm his request, for results that have a threat level of "DANGEROUS". At operation 1468, the user performs the confirmatory gesture.

At operation 1472, in response to the user having performed the confirmatory gesture at operation 1468, web browser 120 attempts to access the requested search result. However, it may be that the requested search result redirects web browser 120 to a different web site. Web browser 120 may register itself to listen to redirection events and, as such, is able to hook a redirection event before it accesses the different web site. At decision 1476, web browser 120 determines whether or not it has been redirected. If so, processing returns to operation 1108 of FIG. 10, where web browser 120 passes an identifier for the redirected web site to scan engine(s) 250 for analysis. Otherwise, if decision 1476 determines that web browser 120 has not been redirected, processing advances to operation 1480, where web browser 120 accesses the content that the user requested at operation 1460. The user then views and interacts with the content at operation 1484, thereby completing flowchart 1400.

Figure 33:
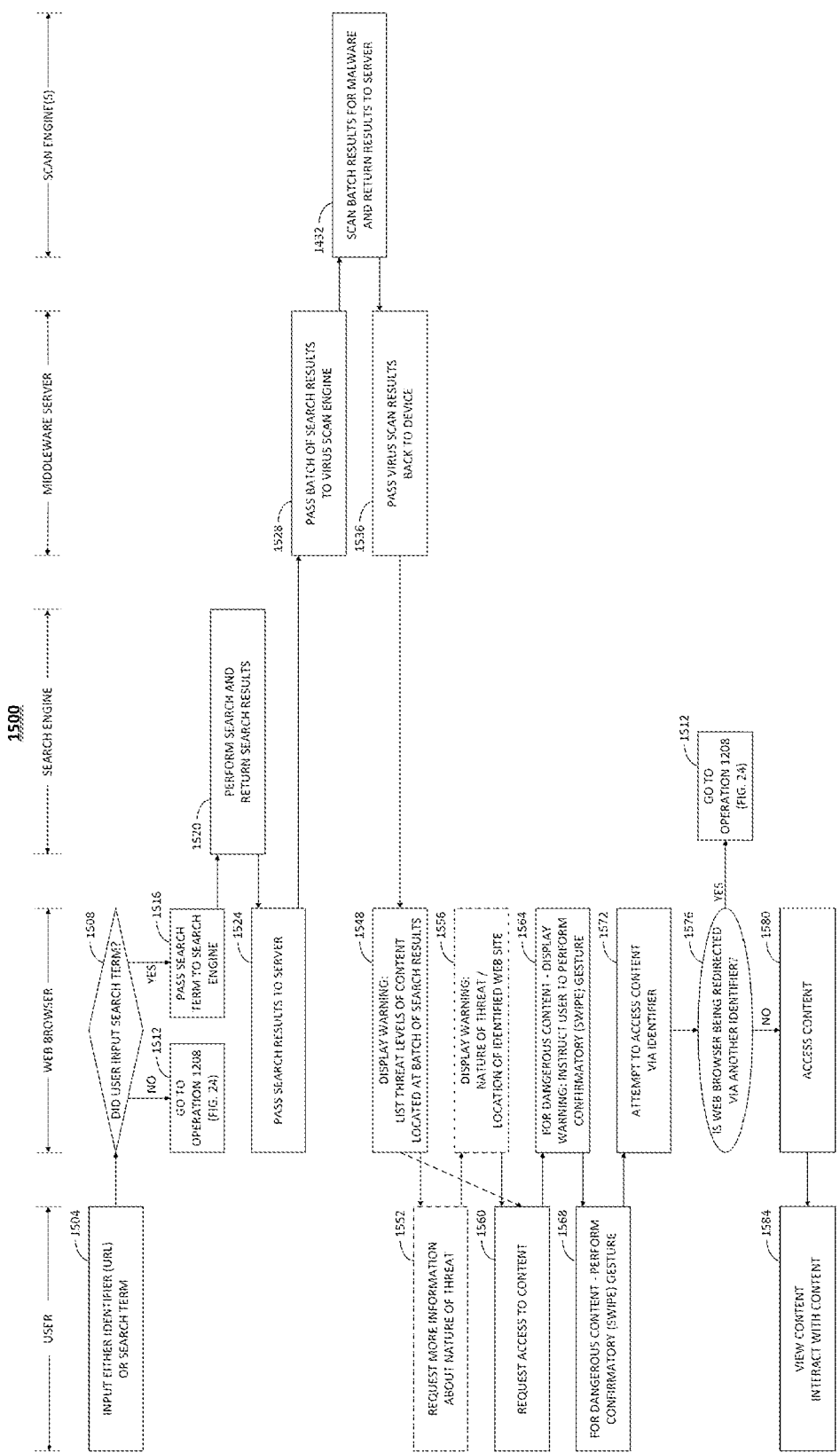
FIG. 33 is a simplified flowchart of a middleware server-based method for malware warning for search results, in accordance with an embodiment of the present invention.

Reference is made to FIG. 33, which is a simplified flowchart 1500 of a middleware server-based method for malware warning for search results, in accordance with an embodiment of the present invention. Flowchart 1500 is divided into five columns. The leftmost column indicates operations performed by a user, the second-from-leftmost column indicates operations performed by web browser 120, the middle column indicates operations performed by search engine(s) 270, the second-from-rightmost column indicates operations performed by middleware server 500, and the rightmost column indicates operations performed by scan engine(s) 250.

At operation 1504 the user enters either an identifier for web content, or a search term. At decision 1508 web browser 120 determines whether or not the user entered a search term. Decision 1508 may be performed as described above with reference to decision 1408 of FIG. 31. If decision 1508 determines that the user did not enter a search term, then at operation 1512 flowchart 1500 advances to operation 1208 of FIG. 24; namely, a method for malware warning for identifiers.

Otherwise, if decision 1508 determines that the user did enter a search term, then at operation 1516 web browser 120 passes the search term to search engine(s) 270. At operation 1520 search engine(s) 270 perform their search and return their search results to web browser 120. At operation 1524 web browser 120 receives the search results, but prior to displaying them to the user, web browser 120 passes a batch of the search results to middleware server 500 for a malware check.

At operation 1528 middleware server 500 passes the batch of search results to scan engine(s) 250 for scanning. At operation 1532, scan engine(s) 250 scan the batch of search results, and return scan results to middleware server 500. At operation 1536 middleware server 500 determines the threat level of each search result based on the scan results received from scan engine(s) 250, and passes malware reports with the threat levels back to web browser 120.

Subsequent operations 1548-1584 are similar to correspondingly numbered operations 1448-1484 of FIG. 31.

In accordance with an alternative embodiment of the present invention, middleware server 500, instead of web browser 120, passes the search terms to search engine(s) 270. In this case, instead of operation 1524, namely, web browser 120 passing the search results to middleware server 500 subsequent to operation 1520, instead web browser 120 passes the search terms to middleware server 500 prior to operation 1520, and then middleware server 500 passes the search results to search engines(s) 270 and receives the search results from search engine(s) 270.

Figure 34:
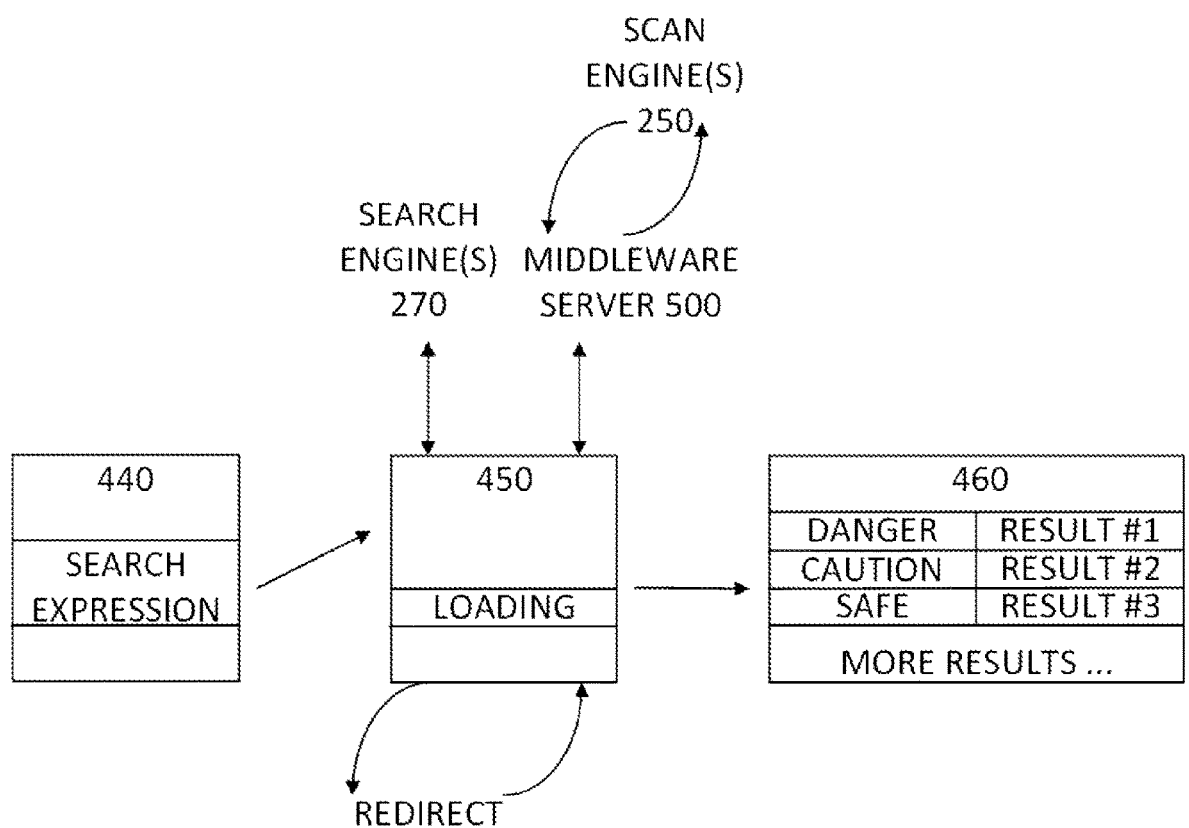
FIG. 34 is a simplified flow diagram using display screens to illustrate stages of a middleware server-based malware warning mechanism for web search results, in accordance with an embodiment of the present invention.

Reference is made to FIG. 34, which is a simplified flow diagram using display screens to illustrate stages of a middleware server-based malware warning mechanism for web search results, in accordance with an embodiment of the present invention. FIG. 34 includes middleware server 500, scan engine(s) 250 and search engine(s) 270. Screen 440 is a landing screen, prompting a user to enter a search expression. Screen 450 is a loading screen. While screen 450 is being displayed, web browser 120 sends the search expression that was entered in screen 410 to search engine(s) 270. After receiving a page of search results, web browser 120 sends the results to middleware server 500, which sends the URLs of the search results to scan engine(s) 250 for analysis. Middleware server 500 determines the threat levels of the search results based on the scan results, and returns malware reports including the threat levels to web browser 120. Warning generator 140A displays a list of results together with their levels of threat, as shown in screen 460.

If the user touches one of the results to request information about the nature of the threat, then web browser 120 performs the warning method of FIG. 10 beginning at operation 1156, and warning generator 140B generates warning information, such as the information shown in FIGS. 15, 17 and 19 for the respective "SAFE", "SUSPICIOUS" and "DANGEROUS" threat levels.

Thus it will be appreciated by those skilled in the art that the present invention prevents a "one touch too late" catastrophe and ensures that a user does not access suspect malware unintentionally, by provide multiple warnings about specific malware that a user is encountering, and by requiring a confirmatory action from the user that is different than a simple touch, prior to accessing a suspicious web site, application or file. The present invention has widespread application to malware protection for computing devices that receive data over a network.

It will be appreciated by those skilled in the art that there are many apparent variations of the modules, systems and methods described above. The operations in the flowcharts of FIGS. 10, 24, 30, 31 and 33 may be performed in a different order than that shown in the flowcharts. For example, referring to FIG. 24, the middleware server may perform operations 1236 and 1244 prior to performing operations 1228 and 1232, or between performance of operations 1228 and 1232.

III. Tracker Detection: Tracker Scanner 127 and Blocker 128

Web tracking is the activity of a website to track and engage its visitors by pushing advertising and content, and to analyze visitor behavior. Web tracking is generally performed by software, such as Javascript, that is embedded in a web page, e.g., the Javascripts shown below appear in a CNN International web page. Portions of the Javascripts are underlined, showing various trackers from Twitter, Facebook, Google and many others being pushed to viewers of the web page.

For reasons of privacy it would be of advantage to provide a user with an option to block tracking, if he prefers not to be tracked. However, the challenge to providing such an option is that when a web browser opens a web page, the browser generally does not recognize those portions of the page that relate to tracking; and even if the browser were to recognize such portions, the browser would need a mechanism in place to block them.

Embodiments of the present invention provide a user who is browsing a web page with an option to selectively block trackers in the web page, if he prefers not to be tracked by certain trackers. The user's browser presents the user with a display of trackers detected in the web page, and presents on/off controls enabling the user to turn one or more of the displayed trackers on and off. When the user turns off one or more of the display trackers, the web page is reloaded without those trackers that the user turned off.

```
<script id="js-set-epic-spec">
    (function setRefDom(win, doc, registryFile)
        {var edition = ((registryFile &&
registryFile.split('_')[0]) || 'international').toUpperCase( ),host =
doc.referrer.replace(/^http(?:s)?\:\/\/([\w\-\.]+).*$/i,
'$1').toLowerCase( );
            win[edition] = win[edition] || { };win[edition].adTargets =
window[edition].adTargets || { };
                if (host.search(/^([\w\-]+\.)*money\.cnn\.com$/) >= 0)
                    {win[edition].adTargets.refdom = 'money';}
                else if (host.search(/^([\w\-
]+\.)*(www|us|edition|next)\.cnn\.com$/) >= 0)
                    {win[edition].adTargets.refdom = 'cnn';}
                else if (host === 't.co')
                    {win[edition].adTargets.refdom = 'twitter';}
                else if (host.search(/^([\w\-]+\.)*facebook\.com$/) >= 0
                    {win[edition].adTargets.refdom = 'facebook';}
                else if (host.search(/^([\w\-
]+\.)*google\.\w{2,3}(\.\w\w)?$/) >= 0)
```

-continued

```
            {win[edition].adTargets.refdom = 'google';}
        else
            {win[edition].adTargets.refdom = 'other';}
    CNN.getRefDom = function getRefDom( )
        {return win[edition].adTargets.refdom;};
        if (CNN.PageParams && typeof CNN.PageParams.adkey ===
'string')
            {win[edition].adTargets.adkey = CNN.PageParams.adkey;}
        CNN.getAdkey = function getAdkey( ){return
win[edition].adTargets.adkey || null;};
        if
(CNN.Utils.exists(CNN.contentModel.analytics.cap_topics))
            {win[edition].adTargets.capTopics =
CNN.contentModel.analytics.cap_topics.split(/,\s*/);}
    CNN.getCapTopics = function getCapTopics( ) {var capTopics =
{ },i, topics;
        if (Array.isArray(win[edition].adTargets.capTopics)
&&CNN.Utils.exists(win[edition].adTargets.capTopics[0])
&&win[edition].adTargets.capTopics[0] !== 'no-value-set')
            {topics = win[edition].adTargets.capTopics;
            for (i = 0; i < topics.length; i++)
                {capTopics[topics[i]] = 'cap';}}return capTopics;};
    }
    (window, document, 'cnni_homepage'));
</script>
<script>
    CNN.adTargets = {protocol: "non-ssl"};
    CNN.AdsConfig = {
        enableAdLock: false,
        enableGalleryAdRefresh:true,
        galleryAdClicks: 4,
        amazon: {"amznkey":"3288"},
        companionAdStates: [
            {
            "label": "small",
            "minWidth":0},
            {
                "label": "large",
                "minWidth":768}],
        desktopSSID: 'edition.cnn.com_main_homepage',
        mobileSSID:
        'edition.cnn.com_mobile_mobileweb_homepage',
    CNN.Edition = "international";
    CNN.EditionCookie = "PreferredEdition";
    CNN.Features = {
        enableAdsConsole: true,
        enableAmazonDisplayAds: true,
        enableEpicAds: true,
        enableFreewheel: true,
        enableGalleryAds: true,
        enableGigyaLogin: true,
        enableKrux: true,
        enableLiveFyre: true,
        enableProximic: true,
        enableRubiconFastlane: true,
        enableAmazonVideoAds: true,
        enableChartbeat: true,
        enableChartbeatMAB: true,
        enableOmniture: true,
        enableOptimizely: true,
        enableOutbrain: true,
        enableOutbrainVideoKPI: true,
        enableZoneOutbrain: true,
    CNN.Chartbeat =
{"MABsrc":"//static.chartbeat.com/js/chartbeat mab.js","src":"//
static.chartbeat.com/js/chartbeat.js","uid":37612};
        CNN.Host = {
        assetPath: "http://edition.i.cdn.cnn.com/.a/2.20.3",
        chrome: "//i.cdn.cnn.com/cnn",cssPath: "/css/2.20.3",
        domain: "http://edition.cnn.com",
        main: "edition.cnn.com",
        sponsorContent: "http://s3.amazonaws.com/cnn-sponsored-
content",
            intl: "http://edition.cnn.com",
            us: "http://us.cnn.com",
            www: "http://www.cnn.com"};
</script>
```

Figure 35:
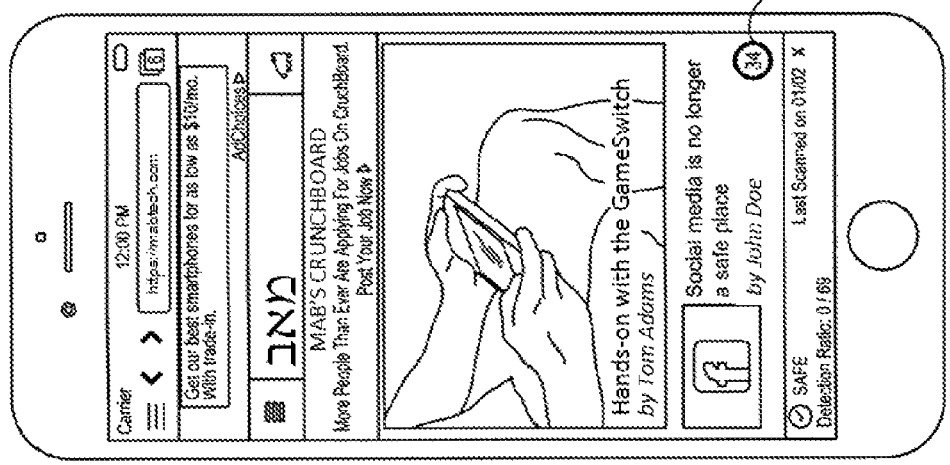
FIG. 35 is a screen shot of a web page with tracker detection, in accordance with an embodiment of the present invention.

Reference is made to FIG. 35, which is a screen shot of a web page with tracker detection, in accordance with an embodiment of the present invention. The web page includes trackers, and tracker control and indicator 325 indicates that 34 trackers have been detected in the web page.

Figure 36:
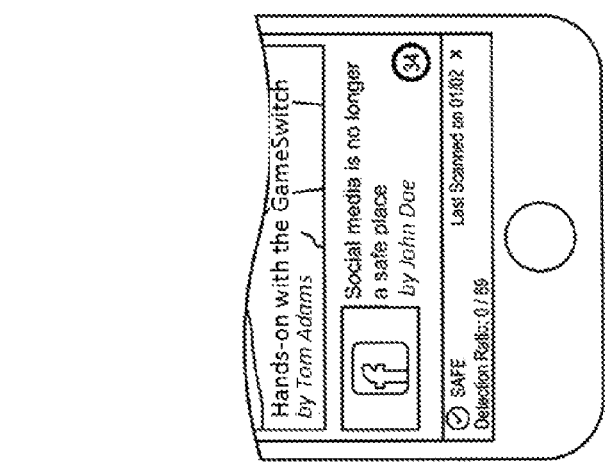
FIG. 36 is a screen shot of a message about trackers that is overlaid on the web page of FIG. 35, in accordance with an embodiment of the present invention.

Reference is made to FIG. 36, which is a screen shot of a message about trackers that is overlaid on the web page of FIG. 35, in accordance with an embodiment of the present invention. The user touches tracker control and indicator 325 to bring up a list of the trackers.

Figure 37:
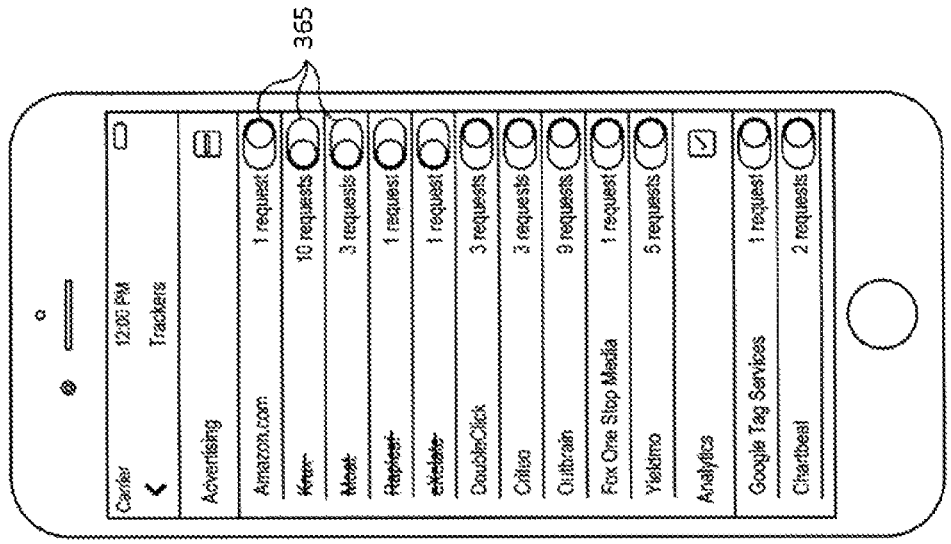
FIG. 37 is a screen shot of a list of trackers that are detected in the web page of FIG. 35, in accordance with an embodiment of the present invention.

Reference is made to FIG. 37, which is a screen shot of a list of trackers that are detected in the web page of FIG. 35, in accordance with an embodiment of the present invention. The list includes advertising trackers including Amazon.com, and analytics trackers including Google Tag services. The list is displayed in response to the user touching tracker control and indicator 325. The trackers are separated into categories including (i) advertising trackers, (ii) analytics trackers, (iii) content trackers, and (iv) social trackers. Alongside each listed tracker is a tracker on/off control 365 for selectively blocking the trackers. Those trackers selected to block, namely, Krux, Moat, Rapleaf, etc., are displayed to the user with strikethrough text.

Reference is made to FIG. 38, which is a screen shot of a web page with tracker detection, before trackers are blocked, in accordance with an embodiment of the present invention. The web page includes advertisements, and tracker control and indicator 325 shows that 39 trackers on the web page have been detected.

Reference is made to FIG. 39, which is a screen shot of tracker on/off controls 365 for turning tracker blocking on and off, in accordance with an embodiment of the present invention. The blocked trackers, namely, Amazon.com, Casale Media, Krux, etc., are displayed with a strikethrough.

Reference is made to FIG. 40, which is a screen shot of a web page that is reloaded after trackers are blocked, in accordance with an embodiment of the present invention. The web page in FIG. 40 is from the same website as the web page of FIG. 38, but is reloaded by the web browser without the various trackers that were present in FIG. 38. It is noted that the number of trackers (30) found in FIG. 40 is less than the number of trackers (39) found in FIG. 38, because 9 of the trackers found in FIG. 38 are blocked in FIG. 40.

Figure 41:
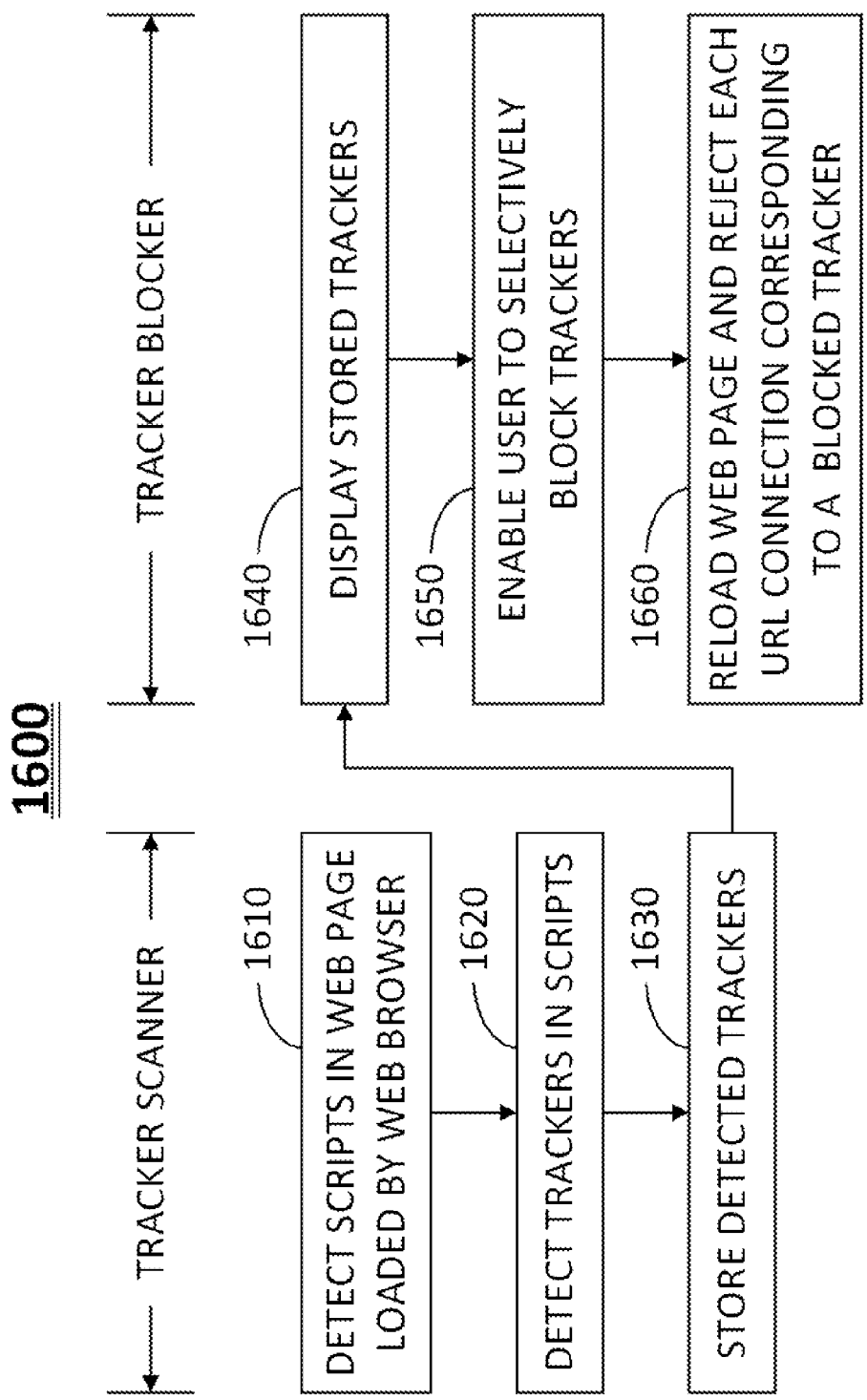
FIG. 41 is a simplified flowchart of a method for tracker scanning and blocking, in accordance with an embodiment of the present invention.

Reference is made to FIG. 41, which is a simplified flowchart 1600 of a method for tracker scanning and blocking, in accordance with an embodiment of the present invention. Flowchart 1600 is divided into two columns, the left column indicating operations performed by tracker scanner 127, and the right column indicating operations performed by tracker blocker 128. Prior to operation 1610, web browser 120 loads a full web page. For an Android operating system implementation, tracker scanner 127 may call a method didFinishLoading( ) to confirm that the web page is fully loaded. For an iOS operating system implementation, tracker scanner 127 may call a method webView-DidFinishLoad( ) to confirm that the web page is fully loaded, At operation 1610 tracker scanner 127 scans the loaded web page to detect the presence of scripts in the loaded web page. For an Android operating system implementation, tracker scanner 127 may call a method evaluateJavascript( ) to scan all Javascript present in the web page, one at a time. Method evaluateJavascript( ) belongs to class android.WebviewClient. For an iOS operating system implementation, the innerHTML of the page may be read, and script tags may be found using class NsScanner.

At operation 1620 tracker scanner 127 compares the URL content of each detected script with a list of known tracker URL connections, to detect the trackers in each script. The list of known URL tracker connections is stored in tracker database 560, and is updated from time to time. In accordance with an embodiment of the present invention, the tracker data in tracker database 560 is downloaded to web browser 120 each time web browser 120 is launched. Whenever URL content of a detected script matches a known URL connection in tracker database 560, a tracker count is incremented. The tracker count is displayed inside tracker control and indicator 325, as shown in FIGS. 35, 36, 38 and 40. A sample list of known URL connections is available from Disconnect, Inc. of San Francisco, Calif. at http://raw.githubusercontent.com/disconnectme/disconnect-tracking-protection/master/services.json At operation 1630 tracker scanner 127 stores the detected trackers, so that they may be accessed by tracker blocker 128.

At operation 1640 tracker blocker 128 displays the trackers that were stored by tracker detector 127 at operation 1630, in a presentation such as that shown in FIG. 39, where each tracker is displayed with a corresponding on/off control 365. The display may be organized in categories including advertising trackers, analytics trackers, content trackers and social trackers.

At operation 1650 tracker blocker 128 enables the user to selectively block one or more of the displayed trackers by means of tracker on/off controls 365. The user may block individual trackers one by one, or may block an entire category of trackers at once, such as blocking all advertising trackers. In an embodiment of the present invention user blocking selections are preserved, and when a tracker is blocked on a specific web page, that tracker remains blocked on all web pages that the user visits, until the user unblocks that tracker.

It has been found that blocking of some trackers may prevent a web page from fully loading. For example, the formatting of a web page may depend on a tracker, and if the tracker is blocked then the web page may not fully load. In accordance with an embodiment of the present invention, a white list of non-blockable trackers is maintained, in order to avoid such a situation where a web page does not load. The white list is loaded into web browser 120 upon launch of web browser 120, and overrides the list of trackers in tracker database 560. Specifically, the URL connections corresponding to the non-blockable trackers in the white list are ignored at operation 1620. As such, the non-blockable trackers in the white list are not stored at operation 1630 and not displayed to the user at operation 1640.

At operation 1660 tracker blocker 128 reloads the web page, rejecting the URL corresponding to each tracker that the user selected to block. For an Android operating system implementation, tracker blocker 128 may call a method shouldInterceptRequest( ) for each URL that is loaded. Method shouldInterceptRequest( ) belongs to class android.WebviewClient, and is operative to intercept a URL connection, and to either accept or reject the connection. If a URL connection is selected for blocking, then the URL connection is rejected using this method. For an iOS operating system implementation, tracker blocker 128 may call a similar method in class NSURLProtocol.

IV. Privacy Manager: Private Tab Manager 129

Figure 42:
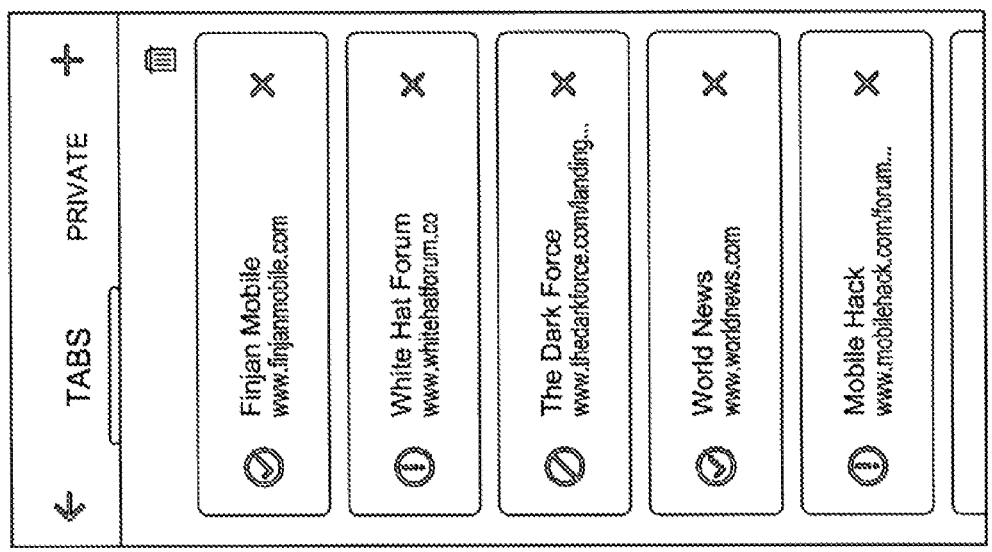
FIGS. 42 and 43 are screen shots of a tab manager that provides for private and non-private tabs, in accordance with an embodiment of the present invention.
Figure 43:
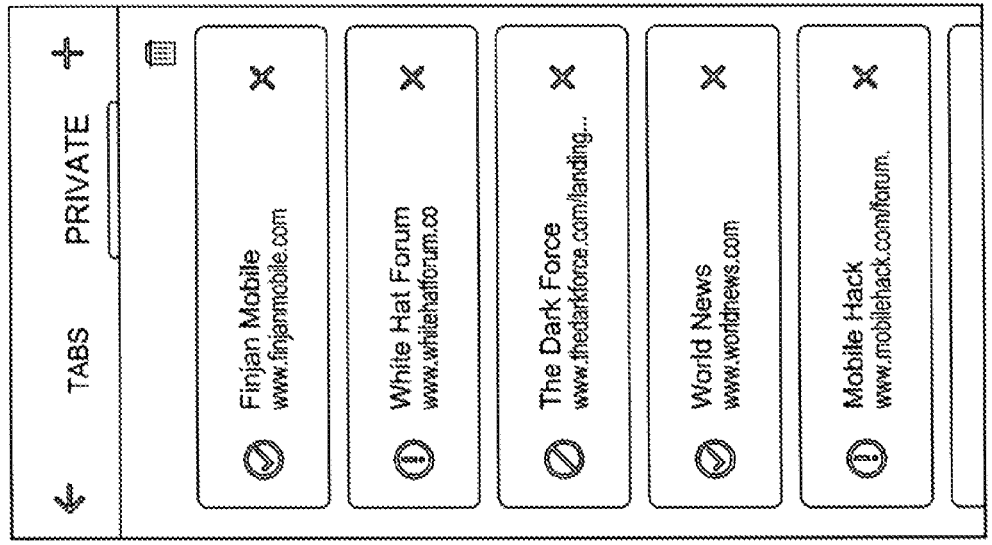

Reference is made to FIGS. 42 and 43, which are screen shots of a tab manager that provides for private and non-private tabs, in accordance with an embodiment of the present invention. When a web page is opened in a private tab, web browser 120 disables recording the web page in a history log of mobile browser 120.

When a web page is displayed in a private tab and a user attempts to set a bookmark for the web page, the user is asked to confirm that he wishes to set the bookmark since it will leave a record of the web page in the history log.

Thus it may be appreciated by those skilled in the art that embodiments of the present invention provide comprehensive secure and private web browsers that protect users from the risks of insecure connections and from malware, and that ensure user privacy by blocking trackers and by preventing logging of user browsing histories.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A mobile web browser embedded in a smartphone operative to open a secure and private session with a web server on the Internet via one or more cell towers, using a mobile IP address of the smartphone, the mobile web browser comprising:
a virtual private network (VPN) connector integrated within a mobile web browser such that the VPN connector loads automatically upon opening the mobile web browser, operative to connect the smartphone to a secure VPN server and to establish a virtual IP address for the smartphone, the virtual IP address corresponding to the location of the VPN server, wherein the VPN connector enables the browser to operate in three modes; namely, (i) a VPN connection alone without web browsing, (ii) web browsing without a VPN connection, and (iii) web browsing with a VPN connection; and
a switch operative to change a current IP address of the smartphone used by the mobile web browser from a non-VPN mobile IP address to the virtual IP address of the VPN server, in a seamless manner without interrupting a current session with a web server.

2. The mobile web browser of claim 1 wherein said VPN connector is operable to connect the smartphone to a plurality of VPN servers, each VPN server being at a different location, wherein said VPN connector displays the plurality of VPN servers to the user, and enables the user to select one of the displayed VPN servers, and wherein said switch is further operable to change the IP address currently used by said mobile web browser to a virtual IP address corresponding to the location of the selected VPN server, in a seamless manner without interrupting the current session with the web server.

3. The mobile web browser of claim 1 wherein said switch is further operable to change the IP address used by the mobile web browser from the virtual IP address corresponding to the location of the VPN server to the mobile IP address of the smartphone, in a seamless manner without interrupting the session with the web server.

4. The mobile web browser of claim 1 wherein the mobile web browser displays an indicator indicating whether or not the smartphone is currently connected to a VPN server.

5. The mobile web browser of claim 1 wherein the mobile web browser generates an alert if a current session with the web server is not secure.

6. A non-transitory computer readable medium storing instructions, which, when executed by a processor of a mobile device, cause the processor to perform a method of secure and private web browsing, comprising:

connecting the mobile device to a secure virtual private network (VPN) server, such that a VPN connector loads automatically upon opening the mobile web browser, and the mobile web browser operates in three modes; namely, (i) a VPN connection alone without web browsing, (ii) web browsing without a VPN connection, and (iii) web browsing with a VPN connection;

receiving a virtual IP address for the mobile device, the virtual IP address corresponding to the location of the VPN server; and changing a non-VPN IP address of the mobile device to the virtual IP address of the VPN server, during a current session between the mobile device and a web server, in a seamless manner without interrupting the current session.

7. The non-transitory computer readable medium of claim 6 wherein the method performed by the processor executing the instructions further comprises:

displaying a plurality of VPN servers to the user;

enabling the user to select one of the displayed VPN servers;

changing the current IP address of the mobile device to a virtual IP address corresponding to the location of the selected VPN server, in a seamless manner without interrupting the current session between the mobile device and the web server.

8. The non-transitory computer readable medium of claim 6 wherein the method performed by the processor executing the instructions further comprises changing the IP address of the mobile web device from the virtual IP address corresponding to the location of the VPN server to a non-VPN IP address of the mobile device, in a seamless manner without interrupting the current session with the web server.

9. The non-transitory computer readable medium of claim 6 wherein the method performed by the processor executing the instructions further comprises displaying an indicator indicating whether or not the mobile device is currently connected to a VPN server.

10. The non-transitory computer readable medium of claim 6 wherein the method performed by the processor executing the instructions further comprises generating an alert if a current session with a web server is not a secure connection.

* * * * *